US012812129B2

(12) United States Patent
Grois et al.

(10) Patent No.: US 12,812,129 B2
(45) Date of Patent: Nov. 24, 2026

(54) METHODS, SYSTEMS, AND APPARATUSES FOR ADAPTIVE PROCESSING OF NON-RECTANGULAR REGIONS WITHIN CODING UNITS

(71) Applicant: Comcast Cable Communications, LLC, Philadelphia, PA (US)

(72) Inventors: Dan Grois, Beer-Sheva (IL); Alexander Giladi, Princeton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 237 days.

(21) Appl. No.: 16/237,048

(22) Filed: Dec. 31, 2018

(65) Prior Publication Data

US 2020/0213595 A1 Jul. 2, 2020

(51) Int. Cl.
*H04N 19/14* (2014.01)
*H04N 19/117* (2014.01)
(Continued)

(52) U.S. Cl.
CPC ........... *H04N 19/14* (2014.11); *H04N 19/117* (2014.11); *H04N 19/159* (2014.11); *H04N 19/176* (2014.11); *H04N 19/66* (2014.11)

(58) Field of Classification Search
CPC .... H04N 19/14; H04N 19/117; H04N 19/119; H04N 19/176; H04N 19/649
See application file for complete search history.

(56) References Cited

U.S. PATENT DOCUMENTS

2008/0165848 A1* 7/2008 Ye ........................ H04N 19/187 375/240.13
2012/0177114 A1 7/2012 Guo et al.
(Continued)

FOREIGN PATENT DOCUMENTS

JP 2015115901 A * 6/2015
JP 2017050744 A * 3/2017
WO WO-2012096614 A2 * 7/2012 ............. H04N 19/46

OTHER PUBLICATIONS

Z. Lei, S. Reddy, V. Cherepanov and Z. Deng, "GPGPU implementation of VP9 in-loop deblocking filter and improvements for AV1 codec," 2017 IEEE International Conference on Image Processing (ICIP), 2017, pp. 925-929, doi: 10.1109/ICIP.2017.8296416. (Year: 2017).*

(Continued)

*Primary Examiner* — Michael Robert Cammarata
(74) *Attorney, Agent, or Firm* — BakerHostetler

(57) ABSTRACT

Systems and methods are described herein for processing video. A coding block of a plurality of coding blocks that are part of a video frame may be partitioned into non-rectangular prediction regions. Prediction areas may be determined based on one or more predetermined criteria that correspond to the non-rectangular prediction regions. Residual signals comprising a difference between the prediction areas and non-rectangular prediction regions may be determined. One or more pixels in the residual signals may be processed to generate processed residual signals. The processing may be based on at least one characteristic of the coding block and configured to minimize inconsistencies of pixel values along a border between the processed residual signals. The coding block comprising the processed residual signals may be encoded for transmission in a bitstream.

20 Claims, 19 Drawing Sheets

(51) Int. Cl.
*H04N 19/159* (2014.01)
*H04N 19/176* (2014.01)
*H04N 19/66* (2014.01)

(56) References Cited

U.S. PATENT DOCUMENTS

| | | | | |
|---|---|---|---|---|
| 2013/0022107 | A1* | 1/2013 | Van der Auwera .. | H04N 19/157<br>375/240.03 |
| 2013/0022115 | A1* | 1/2013 | Oh | H04N 19/11<br>375/240.12 |
| 2013/0058401 | A1* | 3/2013 | Song | H04N 19/82<br>375/E7.193 |
| 2015/0245024 | A1* | 8/2015 | Shin | H04N 19/182<br>375/240.29 |
| 2015/0264357 | A1* | 9/2015 | Alfonso | H04N 19/107<br>375/240.13 |
| 2015/0382025 | A1* | 12/2015 | Gu | H04N 19/14<br>375/240.24 |
| 2018/0288413 | A1* | 10/2018 | Filippov | H04N 19/44 |
| 2018/0295364 | A1* | 10/2018 | Liu | H04N 19/174 |
| 2019/0028703 | A1* | 1/2019 | Tamse | H04N 19/117 |
| 2019/0089953 | A1* | 3/2019 | Chernyak | H04N 19/117 |
| 2019/0158827 | A1* | 5/2019 | Sim | H04N 19/91 |
| 2019/0246103 | A1* | 8/2019 | Jun | H04N 19/119 |
| 2019/0273950 | A1* | 9/2019 | Wang | H04N 19/176 |
| 2019/0281294 | A1* | 9/2019 | Kim | H04N 19/14 |
| 2019/0306534 | A1* | 10/2019 | Zhang | H04N 19/117 |
| 2019/0320171 | A1* | 10/2019 | Zhang | H04N 19/80 |
| 2019/0335208 | A1* | 10/2019 | Lim | H04N 19/157 |
| 2019/0379901 | A1* | 12/2019 | Chiang | H04N 19/176 |
| 2020/0007882 | A1* | 1/2020 | Abe | H04N 19/198 |
| 2020/0014950 | A1* | 1/2020 | Abe | H04N 19/182 |
| 2020/0029095 | A1* | 1/2020 | Karczewicz | H04N 19/82 |
| 2020/0036978 | A1* | 1/2020 | Kim | H04N 19/172 |
| 2020/0059642 | A1* | 2/2020 | Kang | H04N 19/132 |
| 2020/0077089 | A1* | 3/2020 | Lee | H04N 19/159 |
| 2020/0092563 | A1* | 3/2020 | Drugeon | H04N 19/124 |
| 2021/0014488 | A1* | 1/2021 | Ko | H04N 19/117 |
| 2021/0021818 | A1* | 1/2021 | Lee | H04N 19/82 |
| 2021/0021832 | A1* | 1/2021 | Lee | H04N 19/593 |
| 2021/0092397 | A1* | 3/2021 | Kim | H04N 19/117 |
| 2021/0152827 | A1* | 5/2021 | Park | H04N 19/176 |
| 2021/0218962 | A1* | 7/2021 | Lim | H04N 19/14 |
| 2021/0250576 | A1* | 8/2021 | Kim | H04N 19/59 |
| 2021/0274172 | A1* | 9/2021 | Lim | H04N 19/117 |
| 2021/0360285 | A1* | 11/2021 | Urban | H04N 19/132 |
| 2022/0030226 | A1* | 1/2022 | Lee | H04N 19/186 |

OTHER PUBLICATIONS

Y. Chen et al., "An Overview of Core Coding Tools in the AV1 Video Codec," 2018 Picture Coding Symposium (PCS), San Francisco, CA, USA, 2018, pp. 41-45, doi: 10.1109/PCS.2018.8456249. (Year: 2018).*

G. J. Sullivan, J. M. Boyce, Y. Chen, J.-R. Ohm, C. A. Segall and A. Vetro, "Standardized Extensions of High Efficiency Video Coding (HEVC)," in IEEE Journal of Selected Topics in Signal Processing, vol. 7, No. 6, pp. 1001-1016, Dec. 2013, doi: 10.1109/JSTSP.2013.2283657. (Year: 2013).*

Merriam-Webster Dictionary, definition of "around" downloaded Jun. 30, 2025. (Year: 2025).*

R-Ling Liao et al: Panasonic Corporation, CE10.3.1.b: Triangular prediction unit mode, 12th Meeting: Macao, CN, Oct. 3-12, 2018, JVET-The Joint Video Exploration Team of ITU-T SG 16 WP 3 and ISO/IEC JTC 1/SC 29/WG 11, Document No. JVET-L0124-v2, XP030198593, Retrieved from the Internet: Nov. 1, 2018 (Nov. 1, 2018), URL:http://phenix.int-evry.fr/jvet/doc_end_user/documents/12_Macao/wgll/JVET-L0124-v 6.zip JVET-L0124-v2.doc [retrieved on Nov. 1, 2018].

* cited by examiner

METHODS, SYSTEMS, AND APPARATUSES FOR ADAPTIVE PROCESSING OF NON-RECTANGULAR REGIONS WITHIN CODING UNITS

BACKGROUND

The first version of the High Efficiency Video Coding (HEVC) standard was officially approved in 2013. HEVC enables more efficient compression of high-resolution video content, such as 3840×2160 resolutions (e.g., 4K resolution) in terms of luma samples, compared to the preceding standards (e.g., H.264/MPEG-AVC). HEVC provides a good trade-off between the content visual quality and its corresponding bit-rate.

The next generation video coding standard, Versatile Video Coding (VVC) standard has officially started. The VVC standard is being developed with the ultra high-definition, Ultra HD, and high frame rate video requirements in mind (such as 7680×4320 (8K resolution)). However, the average computational complexity of VVC is expected to be several times higher than of its predecessor, HEVC. Therefore, there is a need to improve perceived visual quality with relatively low complexity processing and to further keep the output bit-rate as low as possible as well. These and other shortcomings are addressed in the present disclosure.

SUMMARY

Systems and methods are described herein for processing video. A coding block of a plurality of coding blocks that are part of a video frame may be partitioned into a first non-rectangular prediction region and a second non-rectangular prediction region. Prediction areas may be determined based on one or more predetermined criteria that correspond to the first non-rectangular prediction region and second non-rectangular prediction region. Residual signals comprising a difference between the prediction areas and non-rectangular prediction regions may be determined. The processing may comprise processing one or more pixels in the first residual signal to generate a first processed residual signal, and one or more pixels in the second residual signal to generate a second processed residual signal. The processing may be based on at least one characteristic of the coding block and configured to minimize inconsistencies of pixel values along a border between the first processed residual signal and the second processed residual signal. The coding block comprising the first processed residual signal and the second processed residual signal may be encoded for transmission in a bitstream.

BRIEF DESCRIPTION OF THE DRAWINGS

The following drawings show generally, by way of example, but not by way of limitation, various examples discussed in the present disclosure. In the drawings.

DETAILED DESCRIPTION OF ILLUSTRATIVE EMBODIMENTS

Figure 1:
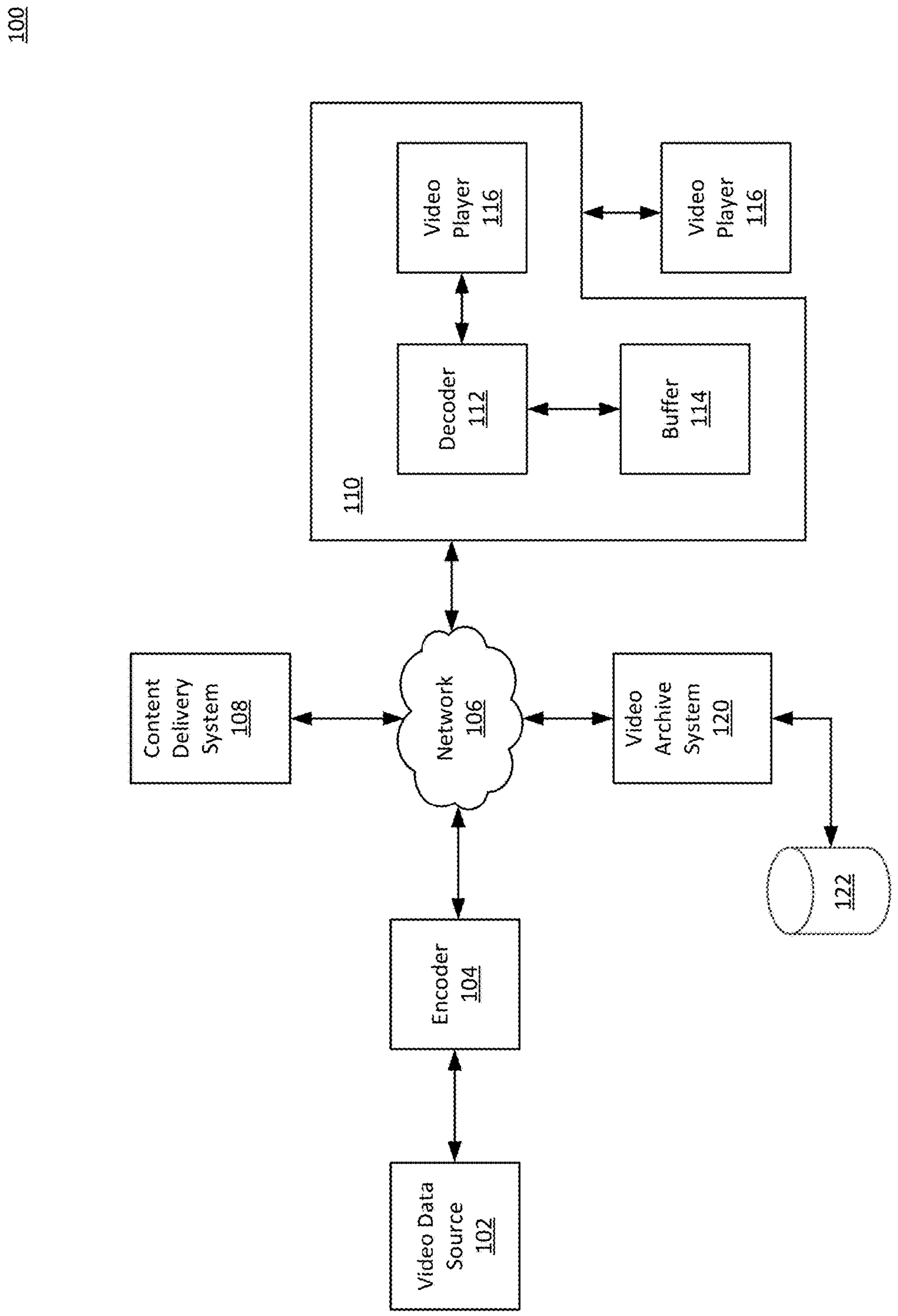
FIG. 1 shows an example system.

Systems and methods are described herein for processing video. The video may comprise High Dynamic Range (HDR) or Standard Dynamic Range (SDR) video content. The systems and methods described herein enable processing HDR video content to preserve the fine details and colors associated with HDR video content. Video content, such as HDR or SDR video content, may comprise video frames or other images. Video frames may comprise pixels. A pixel may comprise a smallest controllable element of a video frame. A video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel. The video may be processed by a video codec comprising an encoder and decoder. When video is transmitted from one location to another, the encoder may encode the video (e.g., into a compressed format) using a compression technique prior to transmission. The decoder may receive the compressed video and decode the video (e.g., into a decompressed format). The systems and methods described herein may process video content using a codec that enables encoding and decoding video content associated with a plurality of resolutions.

Encoding video may comprise partitioning a frame into a plurality of coding tree units (CTUs) that each comprising a plurality of pixels. The CTUs may be partitioned into coding units (CUs) (e.g., coding blocks). The terms coding unit and coding block may be used interchangeably herein. The encoder may generate a prediction of each current CU based on previously encoded data. The prediction may comprise intra-prediction, which is based on previously encoded data of the current frame being encoded. The prediction may comprise inter-prediction, which is based on previously encoded data of a previously encoded reference frame. The inter-prediction stage may comprise determining a prediction unit (PU) (e.g., a prediction area) using motion compensation by determining a PU that best matches a prediction region in the CU. The encoder may generate a residual signal by determining a difference between the determined PU from the prediction region in the CU. The residual signals may then be transformed using, for example, a discrete cosine transform (DCT), which may generate coefficients associated with the residuals. The encoder may then perform a quantization process to quantize the coefficients. The transformation and quantization processes may be performed on transform units (TUs) based on partitions of the CUs. The compressed bitstream may then be transmitted by the encoder. The transmitted compressed bitstream may comprise the quantized coefficients and information to enable the decoder to regenerate the prediction blocks, such as motion vector associated with the motion compensation. The decoder may receive the compressed bitstream and may decode the compressed bitstream to regenerate the video content.

The codec may comprise a Versatile Video Coding (VVC) based video codec. The codec may process, during the inter-prediction stage of the encoding process (e.g., during the motion compensated prediction stage), CUs that have diagonal boundaries (e.g., the CU has been split into triangular or non-rectangular PUs having a diagonal boundary or non-rectangular PUs having a diagonal boundary). The CUs may be partitioned based on various characteristics. The characteristics may comprise, for example, image features and textures. Each triangular or non-rectangular prediction region/unit with a diagonal boundary may be predicted by employing its corresponding reference frame index and its corresponding motion vector (e.g., the uni-prediction motion vector) obtained from a candidate list.

Since the triangular or non-rectangular regions of the CU may be predicted separately, e.g., the different triangular or non-rectangular regions of an image may be predicted separately, an image coded using triangular or non-rectangular prediction units is expected to have inconsistencies, which may result in a visible boundary between the triangular or non-rectangular prediction regions/units. These inconsistencies may lead to an increase in the prediction error, which may become quite high, depending on the content as well.

A clear border in terms of pixel values along a boundary that are substantially different compared to neighboring pixels may be removed using the methods and systems described herein. Pixels on the diagonal boundary between the two triangular or non-rectangular regions and its corresponding neighbor pixels may be filtered for complete removal (or at least minimizing) of inconsistencies of the pixel values within the CU. Adaptive processing may be applied on the diagonal pixel boundaries and on the neighbor pixels. Adaptive processing may comprise applying varied filtering strengths on the CUs. Processing blocks with diagonal boundaries as described herein may enable a more accurate separation of pixels having values that are substantially different in comparison to their neighboring pixels (e.g., an area showing a blue sky may be more accurately separated from an area showing street traffic). Processing blocks with diagonal boundaries as described herein may enable more accurate prediction of these pixels and thereby may enable a smaller prediction error and generate a smaller residual signal on which the transformation and quantization stages of the encoding process may be applied. The smaller prediction error and the smaller residual signal generated using the systems and methods described herein enable a video bitstream to be encoded with a fewer number of bits than conventional encoding techniques.

When encoding video based on VVC, a frame may be divided into a plurality of CTUs (e.g., a coding blocks) that each comprise a plurality of pixels. The CTUs may be partitioned (e.g., split) using a quaternary tree. The leaf nodes may be referred to as CUs. The CUs may be used for prediction and transform without additional splitting/partitioning, except in cases when the CU size is too large compared to a preset maximum transform length (e.g., 64×64 pixels). Compared to H.265/MPEG-HEVC, the maximum allowed size of a luma block CTU in VVC is extended to 128×128 pixels, and the maximum luma transform block (TB) size is extended to 64×64 pixels, which is better suited for higher resolution videos. The supported chroma TB size is 32×32 pixels.

The quaternary tree leaf nodes (e.g., CUs) may be further partitioned by a VVC multi-type tree (MTT) structure (e.g., a nested MTT coding block structure). In VVC, there may be four types of splitting of the CUs: a) vertical binary splitting; b) horizontal binary splitting; c) vertical ternary splitting; and d) horizontal ternary splitting. When a quaternary tree having a nested MTT coding block structure is used, the CUs, PUs, and TUs may have the same block size, except in cases when the supported transform length is smaller than the width/height of the CU color component. In order to meet the TB size limitations noted above, a CU may be split when the width/height of the CU is larger than a maximum transform width/height size. The VVC quadtree with a nested MTT partitioning structure may lead to having a CU-based content adaptive coding tree structure in which the size of each CU may be the same or smaller than the CTU size, but up to 4×4 in terms of luma samples (compared to 8×8 in HEVC).

The triangular or non-rectangular regions of a CU may be processed based on the CU size, the CU shape, the shape of the CU split, and the distance of pixels to be filtered from the CU border. The processing may comprise increasing filter strength as CU size increases in order for the inconsistency between pixel values to be minimized. Using a stronger filter for larger CU sizes may minimize inconsistency between pixel values because during the encoding process, the encoder may not split CUs with relatively flat content into smaller CUs and because artifacts may be more noticeable in a flat content environment. As a result, it may be desirable to filter these artifacts with stronger filter strength. Alternatively or additionally, it may be desirable for the filter to have more taps (e.g., more filter coefficients) in order to improve coding efficiency. For example, a filter may comprise 7 or 9 taps (or more).

Adaptive processing may be applied on the pixel boundary and on the neighbor pixels with substantially different pixel values. The processing adaptation may be carried out based on the following characteristics of the CU:

(a) CU size: The size of a CU may vary. For example, a CU may comprise 64×64 pixels, 64×16 pixels, 32×32 pixels, 32×16 pixels, 16×16 pixels, 16×8 pixels, 8×16 pixels, etc. The number of diagonal pixels or pixels lines (e.g., a diagonal line of pixels) to be processed (filtered) may be determined accordingly based on the CU size. For example, if the CU size is large, such as 64×64 pixels, or 64×32 pixels, it means that the corresponding video content in the CU is relatively flat (e.g., does not contain more complex image details and textures that are encoded with more bits). As a result, stronger processing may be applied on the CU by either increasing a number of diagonal pixels or pixel lines to be filtered (processed) on both sides of the pixel boundary (border) or for example, by applying a stronger smoothing filter (e.g., a larger degree of smoothing). In addition, the filtering strength applied on the diagonal pixels or pixel lines may adaptively vary in accordance with the overall number of the diagonal pixels or pixel lines to be filtered.

(b) CU shape: For example, a CU may comprise a square or rectangular shape. In case of a rectangular CU, the slope of the pixel diagonal border passing within the CU increases. The increased slope leads to less gradual processing of pixels from one row to another row. Therefore, in such as case, the filter applied on the pixels on the diagonal boundary as well as on the neighbor pixels close to this boundary, should be not too strong; otherwise, processing artifacts may appear depending on the video content.

(c) Shape of the CU split: For example, a CU may comprise a symmetrical triangular split resulting in two triangular regions or a non-symmetrical triangular split resulting in a triangular region and a non-rectangular region. In case of the symmetrical triangular split, a number of diagonal pixels or pixel lines to be processed on both sides of the diagonal boundary may be equal. In the case of the non-symmetrical triangular split, a number of the diagonal pixels or pixel lines to be processed on both sides of the diagonal boundary may vary in accordance with the shape of the split and the slope of the diagonal pixel boundary.

(d) Distance of the pixels from the CU border: Because the boundary between the triangular splits of the CU is diagonal, the distance of the pixels from the CU border varies. The closer to the CU border, the less pixels of the CU that should be processed and the processing (e.g., filtering) strength may vary accordingly as well. When processing pixels located adjacent to the CU border, inconsistencies with pixel values of neighboring CUs may be introduced (in case the deblocking is not performed on this CU border). So, in this case, such processing should be either not performed at all, or should be performed with the relatively low strength.

In an example, video data comprising a plurality of frames may be received. Each frame of the plurality of frames may be partitioned into a plurality of coding blocks. A coding block of the plurality of coding blocks may be partitioned into a first non-rectangular prediction region and a second non-rectangular prediction region. The first non-rectangular prediction region may comprise a triangular or non-triangular region of the coding unit and the second non-rectangular prediction region may comprise a triangular or non-triangular region of the coding unit. A first prediction area in at least one reference frame of a plurality of reference frames, that corresponds to the first non-rectangular prediction region may be determined based on one or more predetermined criteria, and a second prediction area in at least one reference frame of the plurality of reference frames, that corresponds to the second non-rectangular prediction region, may be determined based on one or more predetermined criteria. The one or more predetermined criteria may comprise searching for a best match between a prediction area and the first non-rectangular prediction region or second non-rectangular prediction region. A first residual signal comprising a difference between the first prediction area and the first non-rectangular prediction region may be determined. A second residual signal comprising a difference between the second prediction area and the second non-rectangular prediction region may be determined.

One or more pixels of a first plurality of pixels in the first residual signal may be processed to generate a first processed residual signal, and one or more pixels of a second plurality of pixels in the second residual signal may be processed to generate a second processed residual signal, the processing based on at least one characteristic of the coding block and configured to minimize inconsistencies of pixel values along a border between the first processed residual signal and the second processed residual signal. The at least one characteristic of the coding block may comprise a coding block size or coding block shape. The processing may comprise filtering using a discrete Gaussian filter with a plurality of taps and wherein a plurality of coefficients associated with the plurality of taps indicate a filtering strength. If the at least one characteristic of the coding block comprises a coding block size, the filtering may comprise a strength that increases as the coding block size increases. If the at least one characteristic of the coding block comprises a coding block shape, the filtering may comprise a strength that decreases as a slope of the border increases. The filtering may comprise a strength that increases as distance from a border between the coding block and at least one second coding block of the plurality of coding blocks increases. Alternatively or additionally, the processing may comprise applying a weighting factor to each pixel. The coding block comprising the first processed residual signal and the second processed residual signal may be encoded for transmission in a bitstream.

In another example, adaptive processing may be performed on a first plurality of pixels on each side of a boundary between two triangular regions of a CU or between a triangular region and a non-rectangular region of a CU. Closer to the CU border, e.g., at the top-left or bottom-right CU border, a second plurality of pixels comprising a lower number of pixels than the first plurality of pixels may be processed to remove inconsistencies within the CU. The adaptive processing may be performed by applying a low-pass filter with an adaptive number of taps (e.g., an adaptive number of filter coefficients) based on (a) to (d) above. The processing/filtering strength may vary from one pixel to another, or from one row/column of pixels to another.

The adaptive low-pass filter may comprise a filter, such as a discrete Gaussian filter, with a variable number filter coefficients. The filter coefficients may be adaptive and may vary from one row/column to another. The filter coefficients may for example, comprise the following: [1, 4, 6, 4, 1], [1, 4, 6, 9, 6, 4, 1], [1, 4, 6, 9, 12, 9, 6, 4, 1], etc. Filters with a larger number of coefficients may more efficiently remove inconsistencies within the CU, and as a result, may lead to obtaining a smaller prediction error to be further transformed, quantized, and entropy coded with a fewer number of bits. The values coefficients associated with the plurality of taps may indicate a filtering strength. For example, higher values for the coefficients associated with the plurality of taps may indicate an increased filtering strength.

FIG. 1 shows system 100 configured for video processing. The system 100 may comprise a video data source 102, an encoder 104, a content delivery system 108, a computing device 110, and a video archive system 120. The video archive system 120 may be communicatively connected to a database 122 to store archived video data.

The video data source 102, the encoder 104, the content delivery system 108, the computing device 110, the video archive system 120, and/or any other component of the system 100 may be interconnected via a network 106. The network 106 may comprise a wired network, a wireless network, or any combination thereof. The network 106 may comprise a public network, such as the Internet. The network 106 may comprise a private network, such as a content provider's distribution system. The network 106 may communicate using technologies such as WLAN technology based on the Institute of Electrical and Electronics Engineers (IEEE) 802.11 standard, wireless cellular technology, Bluetooth, coaxial cable, Ethernet, fiber optics, microwave, satellite, Public Switched Telephone Network (PTSN), Digital Subscriber Line (DSL), BPL, or any other appropriate technologies.

The video data source 102 may comprise a headend, a video on-demand server, a cable modem termination system, the like, and/or any combination of the foregoing. The video data source 102 may provide uncompressed, raw video data comprising a sequence of frames. The video data source 102 and the encoder 104 may be incorporated as a single device and/or may be co-located at a premises. The video data source 102 may provide the uncompressed video data based on a request for the uncompressed video data, such as a request from the encoder 104, the computing device 110, the content delivery system 108, and/or the video archive system 120.

The content delivery system 108 may receive a request for video data from the computing device 110. The content delivery system 108 may authorize/authenticate the request and/or the computing device 110 from which the request originated. The request for video data may comprise a request for a channel, a video on-demand asset, a website address, a video asset associated with a streaming service, the like, and/or any combination of the foregoing. The video data source 102 may transmit the requested video data to the encoder 104.

The encoder 104 may encode (e.g., compress) the video data. The encoder 104 may transmit the encoded video data to the requesting component, such as the content delivery system 108 or the computing device 110. The content delivery system 108 may transmit the requested encoded video data to the requesting computing device 110. The video archive system 120 may provide a request for encoded video data. The video archive system 120 may provide the request to the encoder 104 and/or the video data source 102. Based on the request, the encoder 104 may receive the corresponding uncompressed video data. The encoder 104 may encode the uncompressed video data to generate the requested encoded video data. The encoded video data may be provided to the video archive system 120. The video archive system 120 may store (e.g., archive) the encoded video data from the encoder 104. The encoded video data may be stored in the database 122. The stored encoded video data may be maintained for purposes of backup or archive. The stored encoded video data may be stored for later use as "source" video data, to be encoded again and provided for viewer consumption. The stored encoded video data may be provided to the content delivery system 108 based on a request from a computing device 110 for the encoded video data. The video archive system 120 may provide the requested encoded video data to the computing device 110.

The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The computing device 110 (and/or the computing device 110 paired with the display 118) may comprise a television, a monitor, a laptop, a desktop, a smart phone, a set-top box, a cable modem, a gateway, a tablet, a wearable computing device, a mobile computing device, any computing device configured to receive and/or playback video, the like, and/or any combination of the foregoing. The decoder 112 may decompress/decode the encoded video data. The encoded video data may be received from the encoder 104. The encoded video data may be received from the content delivery system 108, and/or the video archive system 120.

Figure 2:
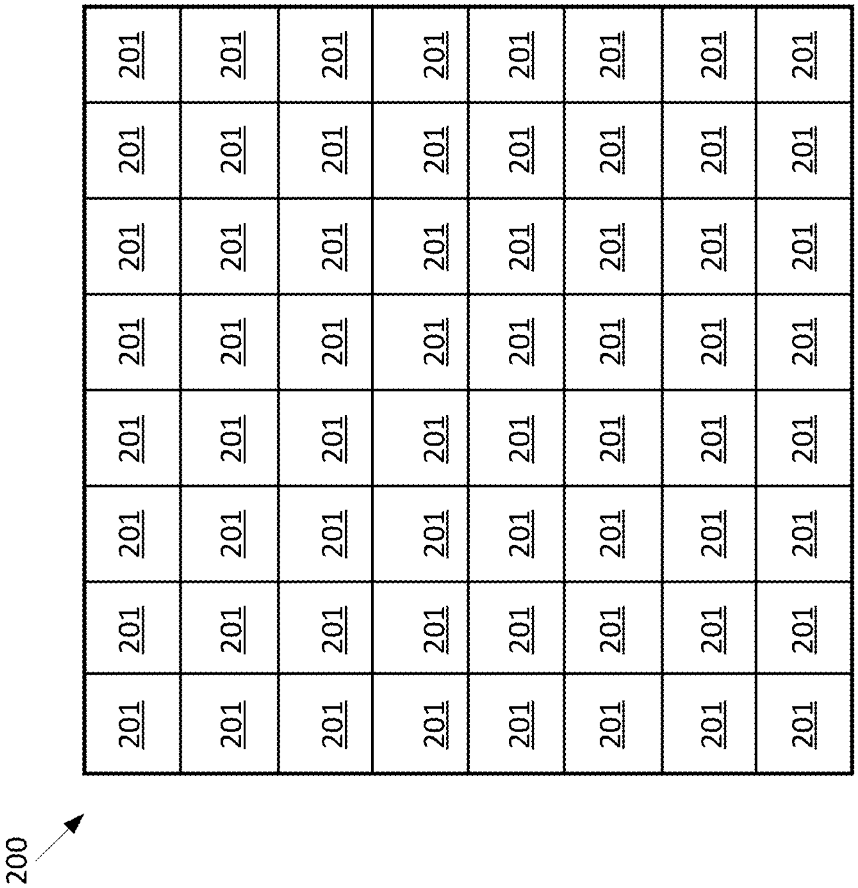
FIG. 2 shows example division to a coding tree unit (CTU)

FIG. 2 shows an example division to a coding tree unit (CTU) 200. In the example of FIG. 2, a frame is divided into a plurality of CTUs 201. As described above, a luma block in CTU 201 in VVC may comprise 128×128 pixels. The maximum luma transform block (TB) size may comprise 64×64 pixels, and the maximum chroma TB size may comprise 32×32 pixels.

Figure 3A:
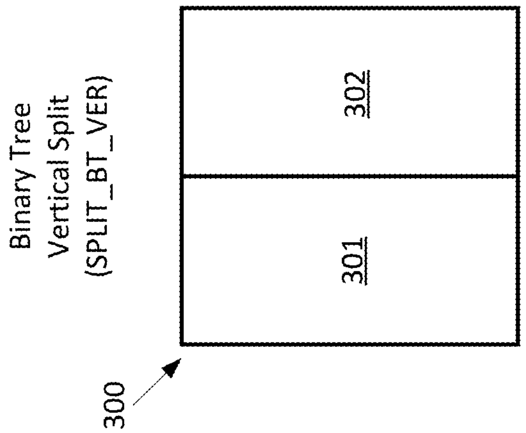
FIG. 3A shows a CTU split using vertical binary splitting type.

FIGS. 3A-3D show examples of splitting types of a VVC multi-type tree structure. FIG. 3A shows a CTU 300 split using vertical binary splitting type. When using a vertical binary splitting type, the CTU 300 is split vertically using a binary tree into two CUs, 301 and 302.

Figure 3B:
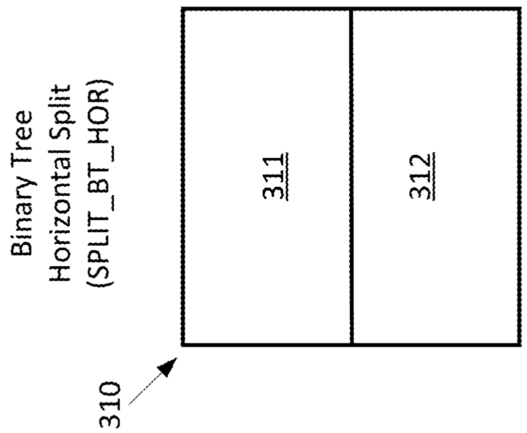
FIG. 3B shows a CTU split using shows a horizontal binary splitting.

FIG. 3B shows a CTU 310 split using shows a horizontal binary splitting type. When using a horizontal binary splitting type, the CTU 310 is split horizontally using a binary tree into two CUs, 311 and 312.

Figure 3C:
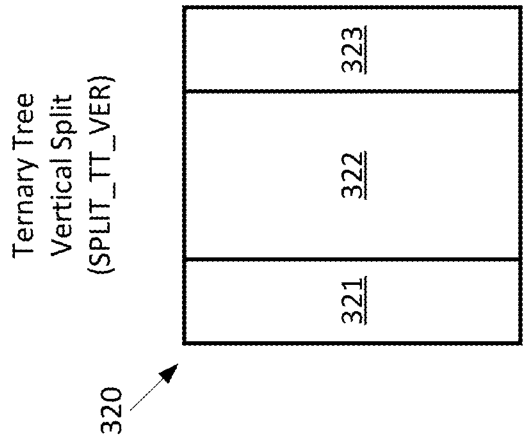
FIG. 3C shows a CTU split using a vertical ternary splitting.

FIG. 3C shows a CTU 320 split using a vertical ternary splitting. When using a vertical ternary splitting type, the CTU 320 is split vertically using a ternary tree into three CUs, 321, 322, and 323.

Figure 3D:
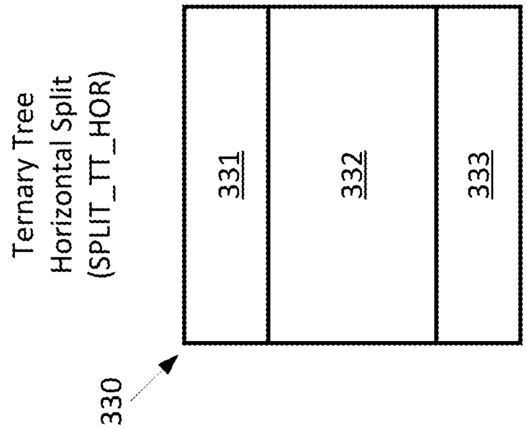
FIG. 3D shows a CTU split using a horizontal ternary splitting.

FIG. 3D shows a CTU 330 split using a horizontal ternary splitting. When using a horizontal ternary splitting type, the CTU 330 is split horizontally using a ternary tree into three CUs, 331, 332, and 333.

Figure 4:
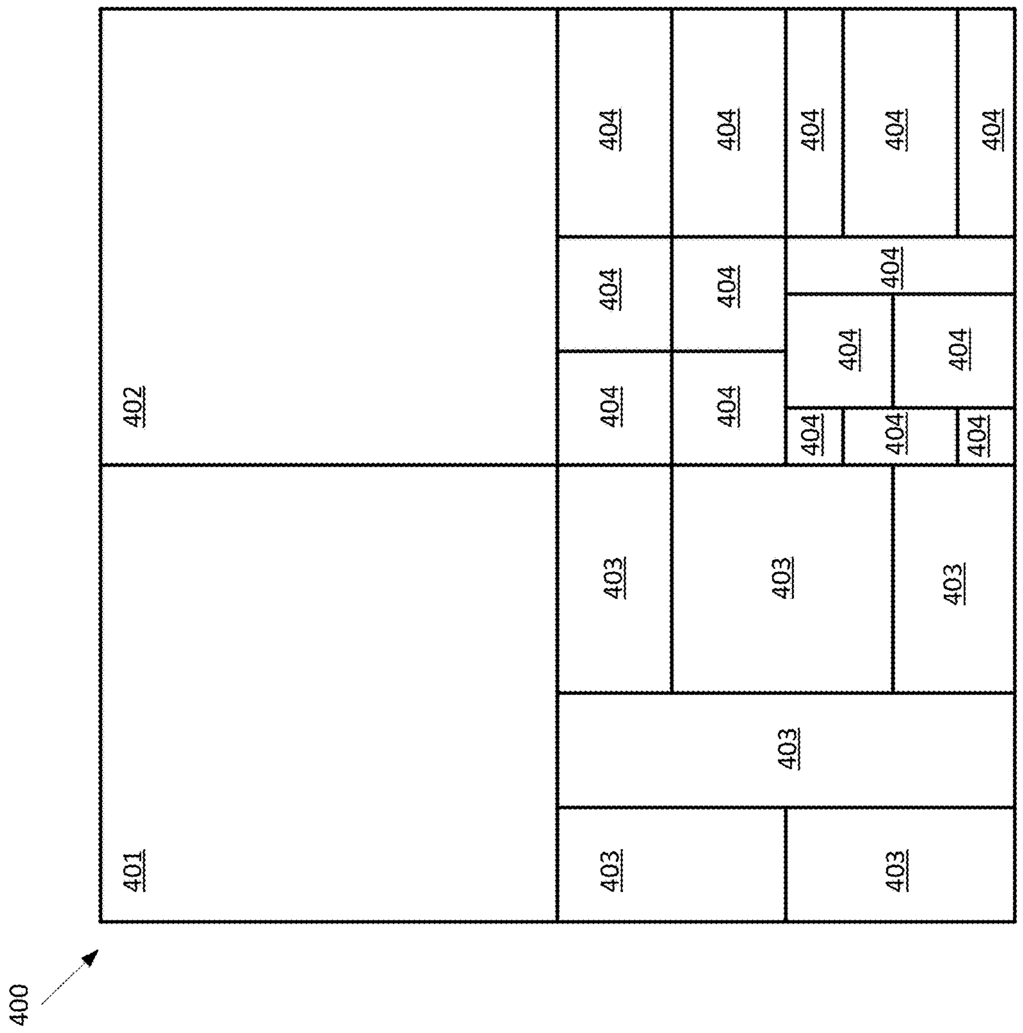
FIG. 4 shows an example quaternary tree with a nested multi-type tree (MTT) coding block structure.

FIG. 4 shows an example quaternary tree with a nested MTT coding block structure 400. A CTU (e.g., a root of a quaternary tree) may be split into multiple CUs (e.g., tree leaf nodes). The CUs 401, 402, 403, and 404 may be partitioned into a MTT coding block structure. It should be noted that the splitting is done at the encoder end in order to adapt to various local characteristics (e.g., image features, textures). The CUs 401, 402, 403, and 404 may have square/rectangular shapes as shown.

In the example of FIG. 4, the CUs 401 and 402 are not split into smaller regions. This may be based on whether the corresponding image portion (represented by these CUs 401 and 402) is flat. The image portion may be flat when it represents, for example, a blue sky. The CUs 403 and 404 are split into plurality of regions while some are split more and some are split less. The regions in the CUs 403 and 404 that are split into a plurality of regions may represent more complex image details and textures that are encoded with more bits.

Figure 5A:
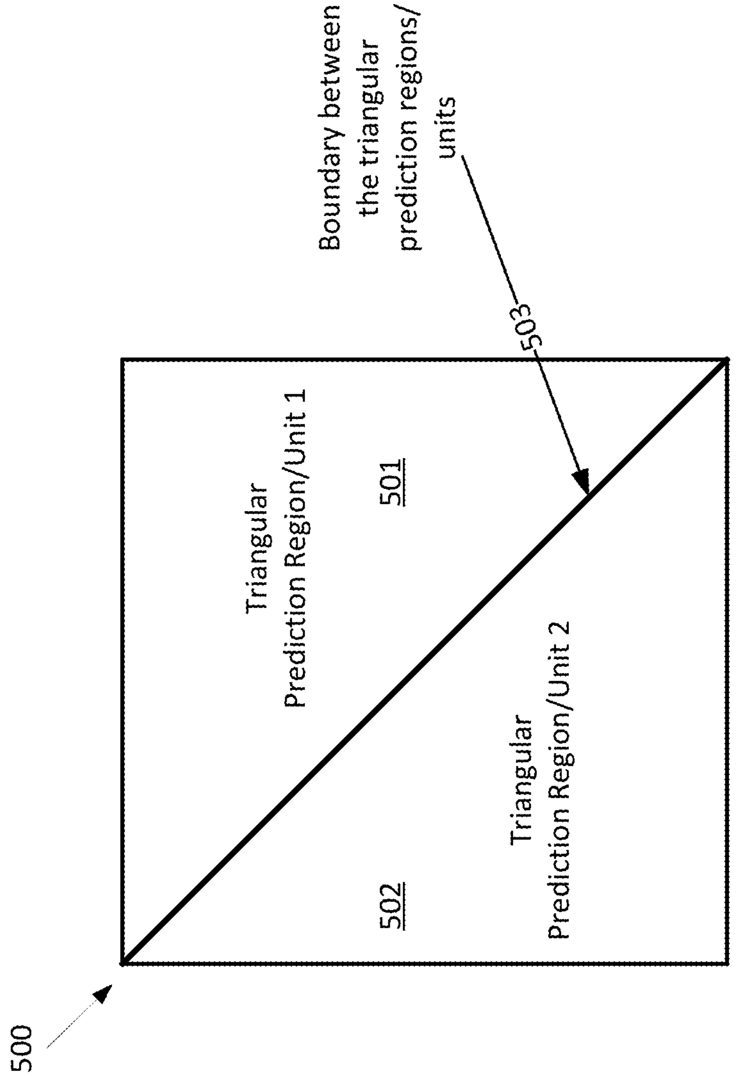
FIG. 5A shows a single CU that is split using triangular prediction regions/units.

FIG. 5A shows a single CU 500 that is split using triangular prediction regions/units. The CU 500 is split into triangular prediction region/unit 501 and triangular prediction region/unit 502. The split of the CU is in a diagonal direction 503 generating a diagonal boundary between triangular prediction region/unit 501 and triangular prediction region/unit 502. Each triangular prediction region/unit 501 and triangular prediction region/unit 502 may be predicted by employing its corresponding reference frame index and its corresponding motion vector (e.g., the uni-prediction motion vector) obtained from a candidate list. The transformation and quantization stages may then be applied on the whole CU 500.

Figure 5B:
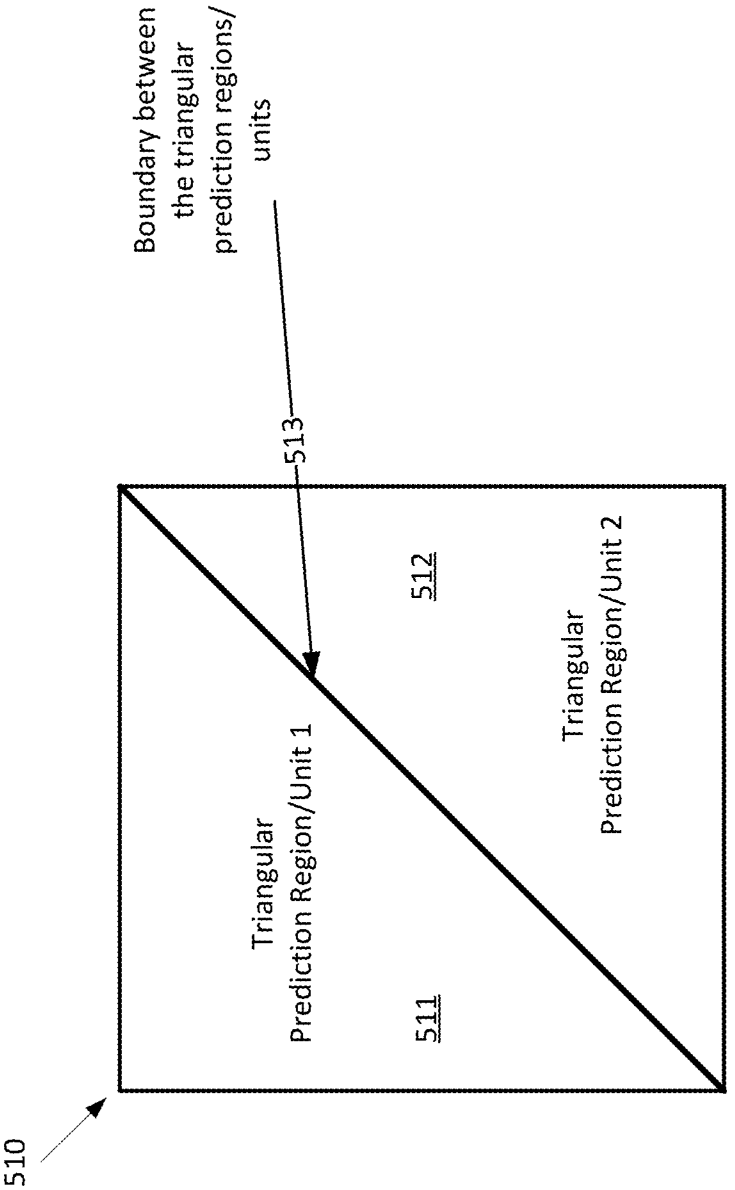
FIG. 5B shows a single CU that is split using triangular prediction regions/units.

FIG. 5B shows a single CU 510 that is split using triangular prediction regions/units. The CU 510 is split into triangular prediction region/unit 511 and triangular prediction region/unit 512. The split of the CU is in an inverse-diagonal direction 513 generating an inverse-diagonal boundary between triangular prediction region/unit 511 and triangular prediction region/unit 512. Each triangular prediction region/unit 511 and triangular prediction region/unit 512 may be predicted by employing its corresponding reference frame index and its corresponding motion vector (e.g., the uni-prediction motion vector) obtained from a candidate list. The transformation and quantization stages may then be applied on the whole CU 510.

Figure 6:
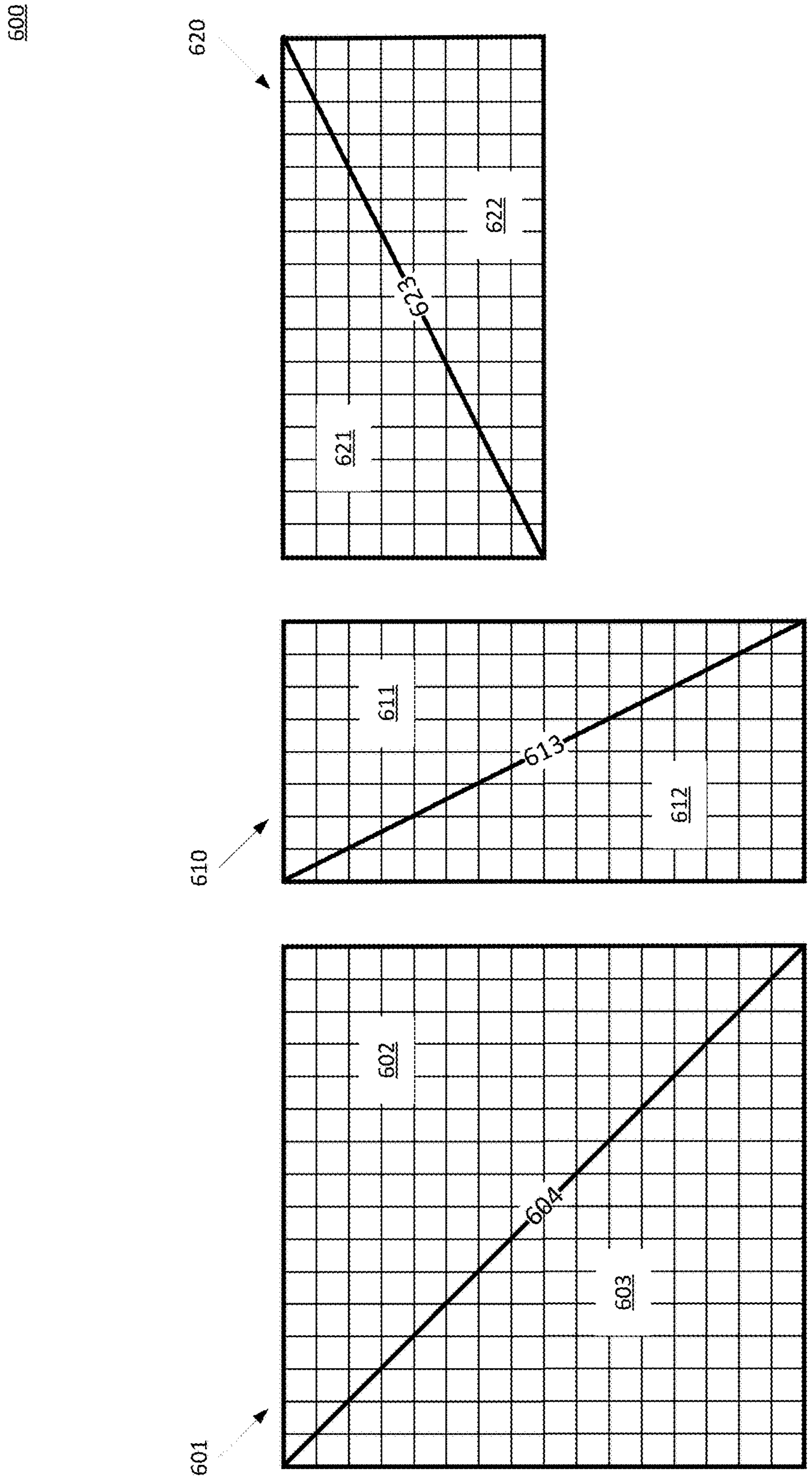
FIG. 6 shows examples 600 of different CU sizes.

FIG. 6 shows examples 600 of different CU sizes. The CUs shown in FIG. 6 include both square and rectangular CUs. The square CU 601 is split into triangular prediction region/unit 602 and triangular prediction region/unit 603. The split of the CU is in a diagonal direction 604 generating a diagonal boundary between triangular prediction region/unit 602 and triangular prediction region/unit 603. The rectangular CU 610 is split into triangular prediction region/unit 611 and triangular prediction region/unit 612. The split of the CU is in a diagonal direction 613 generating a diagonal boundary between triangular prediction region/unit 611 and triangular prediction region/unit 612. The rectangular CU 620 is split into triangular prediction region/unit 621 and triangular prediction region/unit 622. The split of the CU is in an inverse-diagonal direction 623 generating an inverse-diagonal boundary between triangular prediction region/unit 621 and triangular prediction region/unit 622.

Figure 7A:
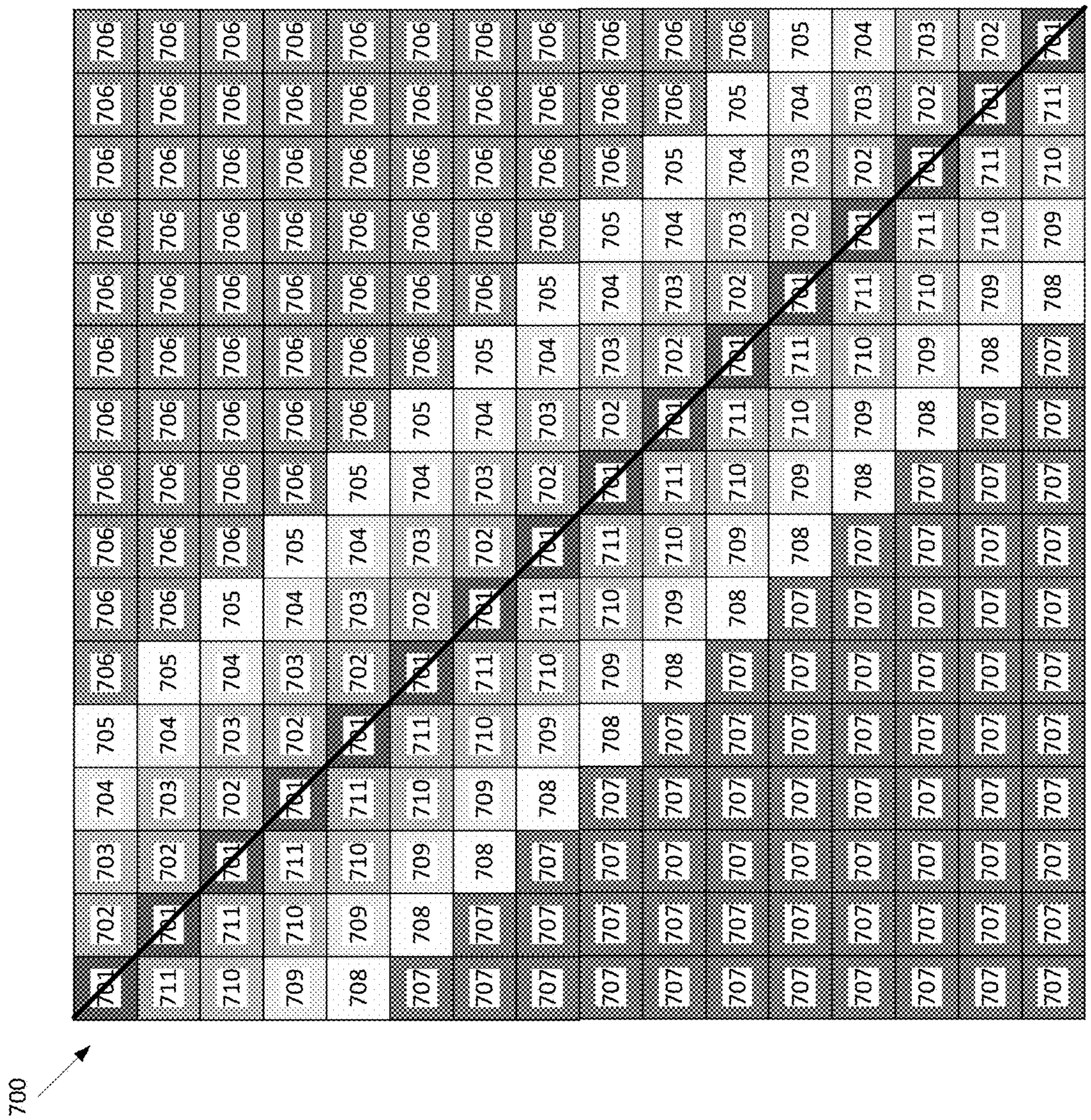
FIG. 7A shows an example of pixels on a boundary between two triangular prediction regions of a CU.

FIG. 7A shows an example of pixels on a boundary between two triangular prediction regions of a CU 700. The CU 700 is split into two triangular prediction regions. The triangular prediction region boundary passes through pixels 701, which define a clear border in terms of pixel values that are substantially different compared to pixels 702, 703, 704, 705, 706, 707, 708, 709, 710, and 711. In order to minimize prediction error and increase coding gain, the boundary passes through pixels 701 should be removed. The systems and methods described herein enable the pixels 701 on the boundary between the two triangular regions and its corresponding colored neighbor pixels 702, 703, 704, 705, 706, 707, 708, 709, 710, and 711 (samples) to be filtered for complete removal (or at least minimizing) of inconsistencies of the pixel values within the CU 700.

Figure 7B:
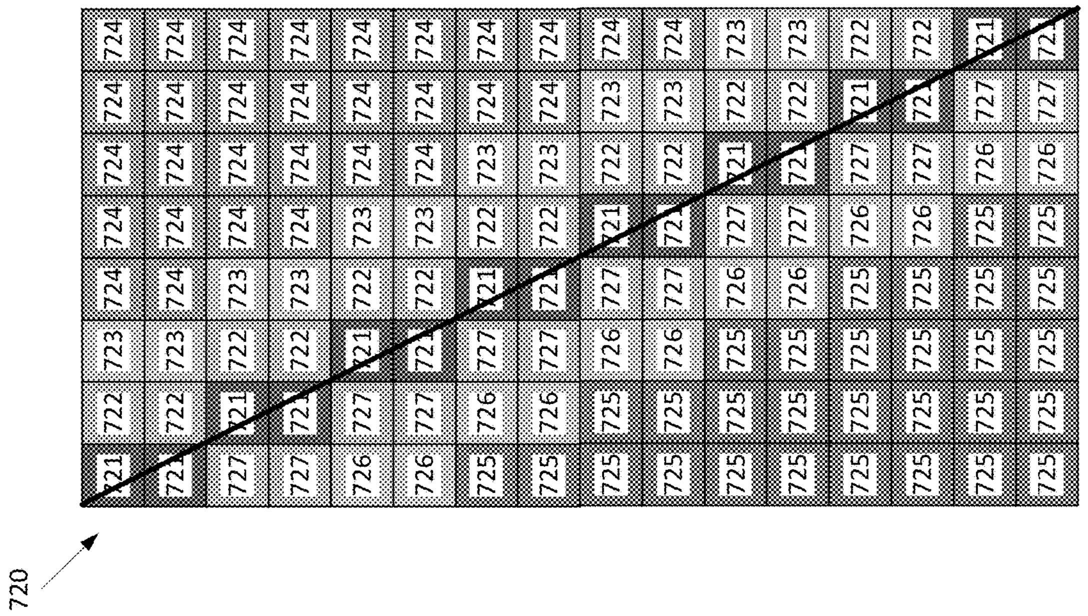
FIG. 7B shows an example of pixels on a boundary between two triangular prediction regions of a CU.

FIG. 7B shows an example of pixels on a boundary between two triangular prediction regions of a CU 720. The CU 720 is split into two triangular prediction regions. The triangular prediction region boundary passes through pixels 721, which define a clear border in terms of pixel values that are substantially different compared to pixels 722, 723, 724, 725, 726, and 727. In order to minimize prediction error and increase coding gain, the boundary passes through pixels 721 should be removed. The systems and methods described herein enable the pixels 721 on the boundary between the two triangular regions and its corresponding colored neighbor pixels 722, 723, 724, 725, 726, and 727 (samples) to be filtered for complete removal (or at least minimizing) of inconsistencies of the pixel values within the CU 720.

Figure 7C:
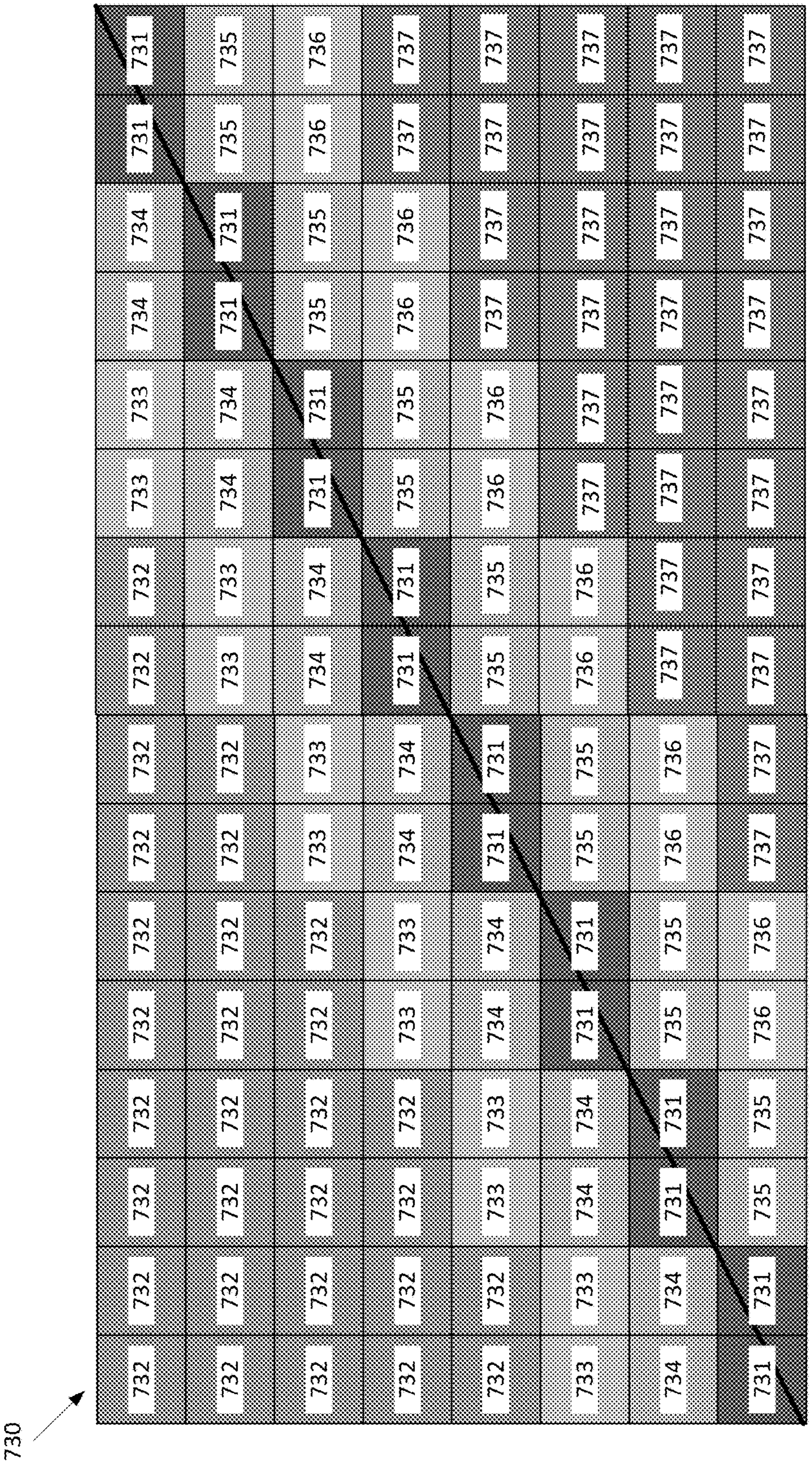
FIG. 7C shows an example of pixels on a boundary between two triangular prediction regions of a CU.

FIG. 7C shows an example of pixels on a boundary between two triangular prediction regions of a CU 730. The CU 730 is split into two triangular prediction regions. The triangular prediction region boundary passes through pixels 731, which define a clear border in terms of pixel values that are substantially different compared to pixels 732, 733, 734, 735, 736, and 737. In order to minimize prediction error and increase coding gain, the boundary passes through pixels 731 should be removed. The systems and methods described herein enable the pixels 731 on the boundary between the two triangular regions and its corresponding colored neighbor pixels 732, 733, 734, 735, 736, and 737 (samples) to be filtered for complete removal (or at least minimizing) of inconsistencies of the pixel values within the CU 730.

The systems and methods described herein apply adaptive processing on a pixel boundary (e.g., the pixels 701 of FIG. 7A, the pixels 721 of FIG. 7B, and the pixels 731 of FIG. 7C) and on the neighbor pixels with substantially different pixel values. The processing adaptation may be carried out based on factors (a)-(d) identified above: CU size, CU shape, shape of CU split, and distance of the pixels from the CU border. For example, referring to FIG. 7A, adaptive processing may be performed on 4 pixels on each side of the boundary, which comprises pixels 702, 703, 704, 705, 708, 709, 710, and 711. However, closer to the CU border, e.g., at the top-left or bottom-right CU border, only 3 or even 2 pixels may be processed to remove inconsistencies within the CU. The adaptive processing may be performed by applying a low-pass filter with an adaptive number of taps (e.g., an adaptive number of filter coefficients) depending on points (a) to (d) above. Further, the processing/filtering strength may vary from one pixel to another, or from one row/column of pixels to another.

As described above, the adaptive low-pass filter may comprise a filter, such as a discrete Gaussian filter with a variable number of taps (e.g., a variable number of filter coefficients). The filter coefficients may be adaptive and may vary from one row/column to another. The filter coefficients may for example, comprise the following: [1, 4, 6, 4, 1], [1, 4, 6, 9, 6, 4, 1], [1, 4, 6, 9, 12, 9, 6, 4, 1], etc. Filters with a larger number of coefficients may more efficiently remove inconsistencies within the CU, and as a result, may lead to obtaining a smaller prediction error to be further transformed, quantized, and entropy coded with a fewer number of bits.

Instead of splitting a CU into two triangular prediction regions/units, a CU may be split by using shapes other than rectangular or triangular.

Figure 8:
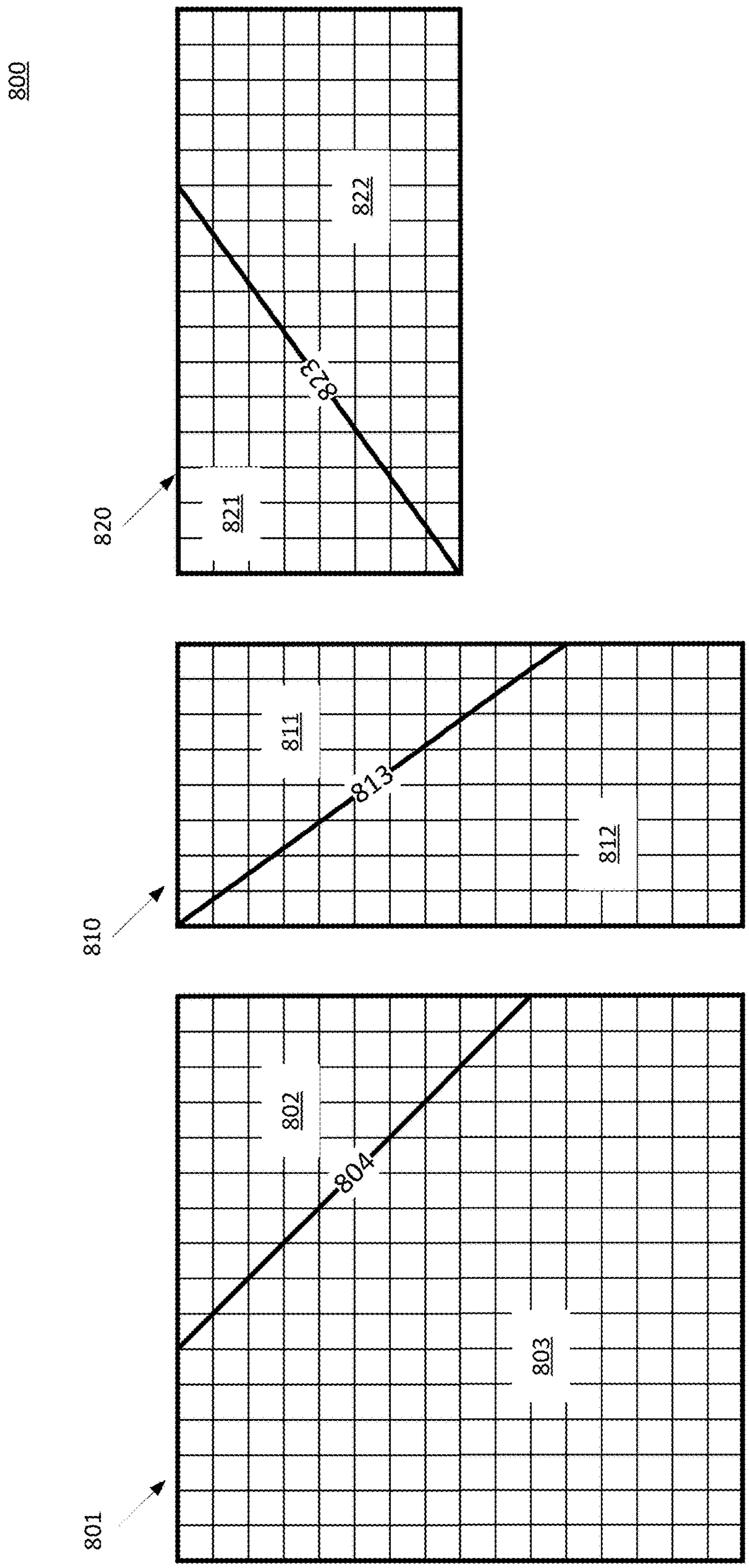
FIG. 8 shows examples of prediction regions obtained by splitting a CU into non-rectangular shapes.

FIG. 8 shows examples of prediction regions obtained by splitting a CU into non-rectangular shapes 800. In this case, the processing may be performed in an adaptive manner as well by applying an adaptive filter with a varying number of taps. The CUs shown in FIG. 8 include both square and rectangular CUs. The square CU 801 is split into two prediction regions. The two prediction regions comprise triangular prediction region/unit 802 and non-triangular prediction region/unit 803. The split of the CU is in a diagonal direction 804 generating a diagonal boundary between the prediction regions. The rectangular CU 810 is split into two prediction regions. The two prediction regions comprise triangular prediction region/unit 811 and non-triangular prediction region/unit 812. The split of the CU is in a diagonal direction 813 generating a diagonal boundary between the prediction regions. The rectangular CU 820 is split into two prediction regions. The two prediction regions comprise triangular prediction region/unit 821 and non-triangular prediction region/unit 822. The split of the CU is in an inverse-diagonal direction 823 generating a diagonal boundary between the prediction regions.

Figure 9A:
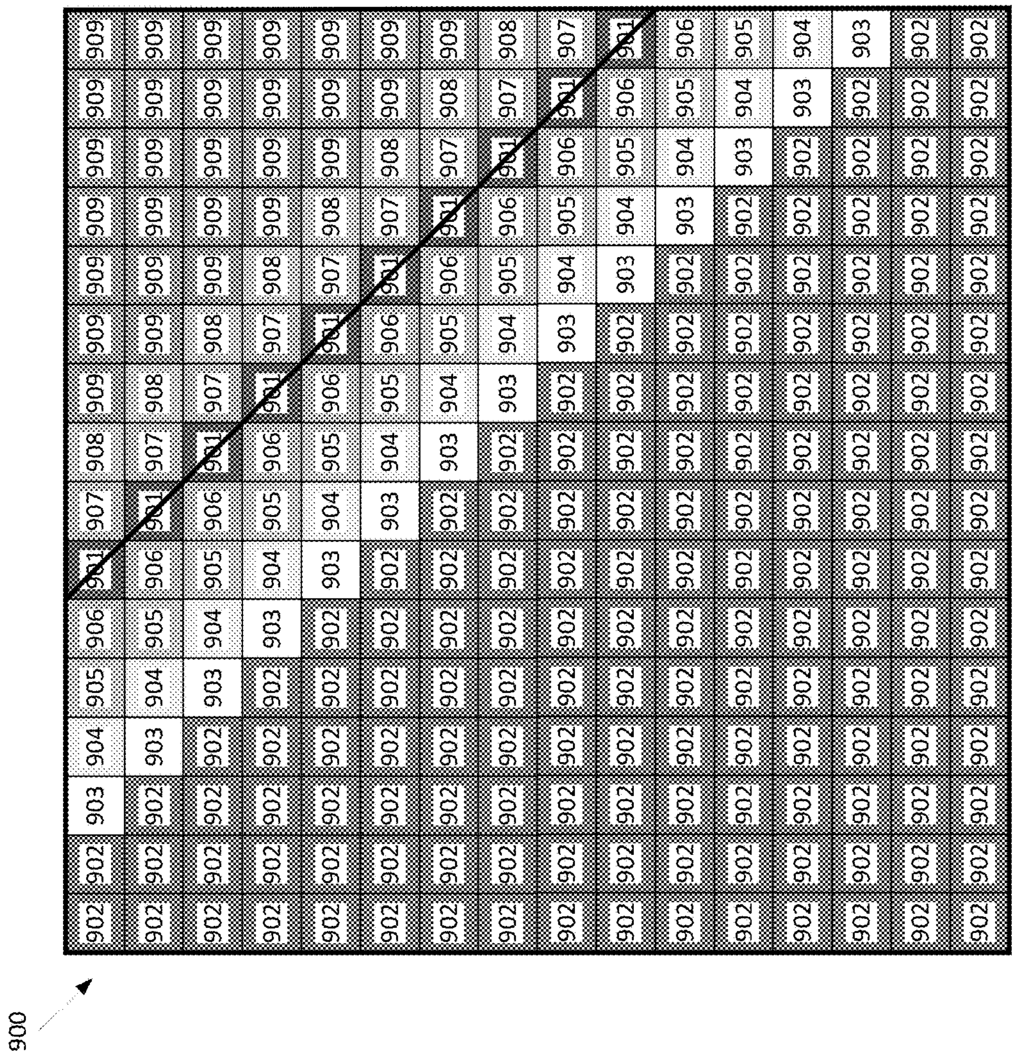
FIG. 9A shows an example of pixels on a boundary between two non-rectangular regions of a CU.

FIG. 9A shows an example of pixels on a boundary between two non-rectangular regions of a CU 900. The CU 900 is split into a triangular prediction region/unit and a non-triangular prediction region/unit. The prediction region boundary passes through pixels 901, which define a clear border in terms of pixel values that are substantially different compared to pixels 902, 903, 904, 905, 906, 907, 908, and 909. The systems and methods described herein enable the pixels 901 on the boundary between the two non-rectangular regions and its corresponding colored neighbor pixels 902,

903, 904, 905, 906, 907, 908, and 909 (samples) to be filtered for complete removal (or at least minimizing) of inconsistencies of the pixel values within the CU 900. In the example of FIG. 9A, on the top-right side of the boundary less pixels should be processed for reducing/removing the pixel value inconsistencies.

Figure 9B:
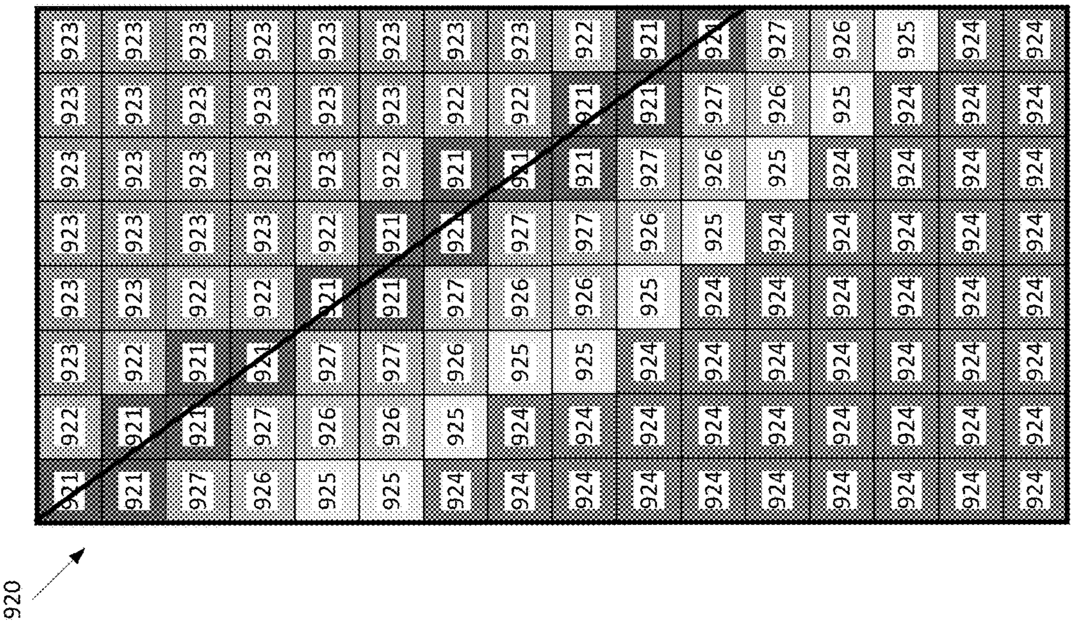
FIG. 9B shows an example of pixels on a boundary between two non-rectangular regions of a CU.

FIG. 9B shows an example of pixels on a boundary between two non-rectangular regions of a CU 920. The CU 920 is split into a triangular prediction region/unit and a non-triangular prediction region/unit. The prediction region boundary passes through pixels 921, which define a clear border in terms of pixel values that are substantially different compared to pixels 922, 923, 924, 925, 926, and 927. The systems and methods described herein enable the pixels 921 on the boundary between the two non-rectangular regions and its corresponding colored neighbor pixels 922, 923, 924, 925, 926, and 927 (samples) to be filtered for complete removal (or at least minimizing) of inconsistencies of the pixel values within the CU 920. In the example of FIG. 9B, on the top-right side of the boundary less pixels should be processed for reducing/removing the pixel value inconsistencies.

Figure 9C:
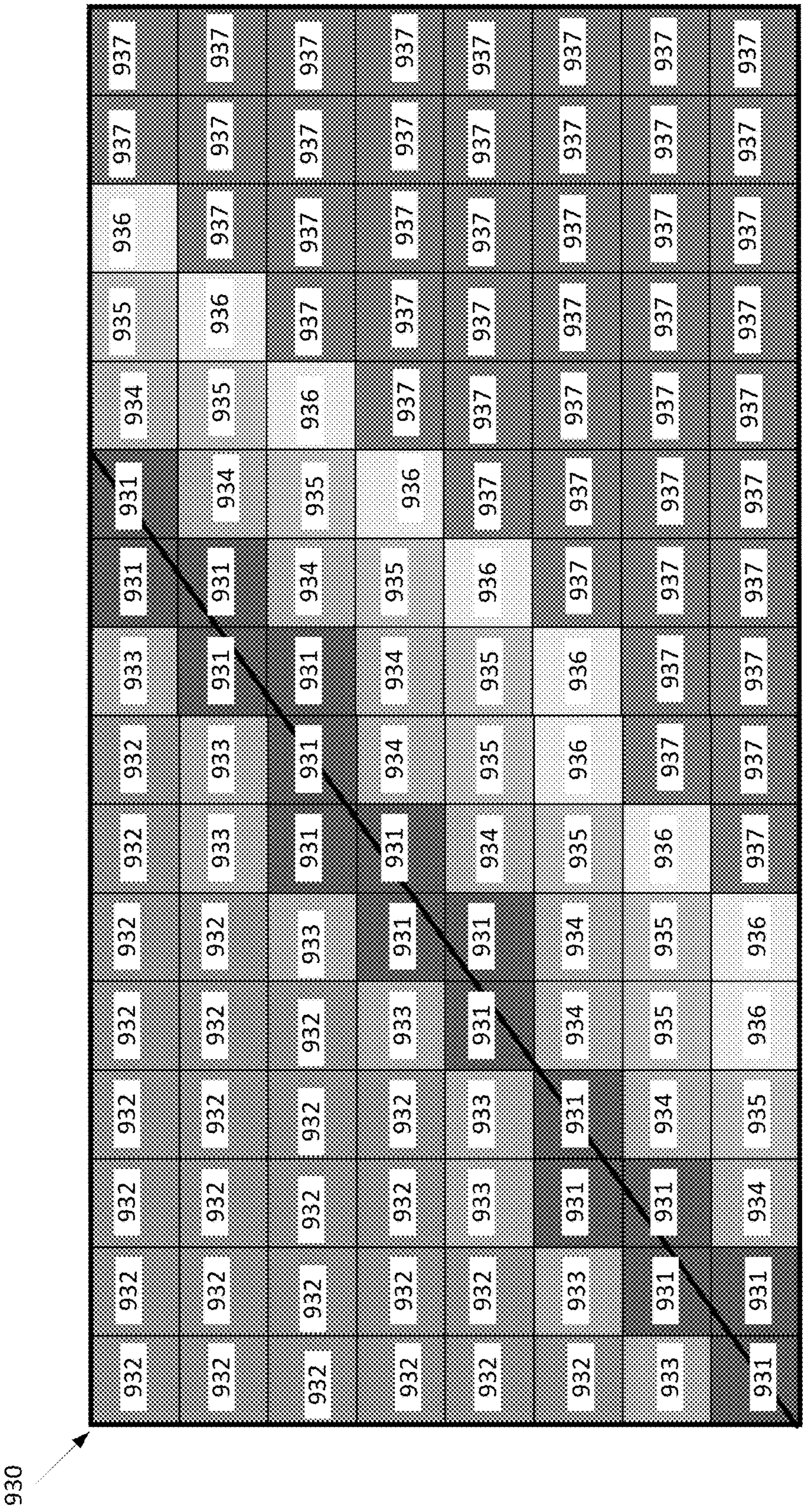
FIG. 9C shows an example of pixels on a boundary between two non-rectangular regions of a CU.

FIG. 9C shows an example of pixels on a boundary between two non-rectangular regions of a CU 930. The CU 930 is split into a triangular prediction region/unit and a non-triangular prediction region/unit. The prediction region boundary passes through pixels 931, which define a clear border in terms of pixel values that are substantially different compared to pixels 932, 933, 934, 935, 936, and 937. The systems and methods described herein enable the pixels 931 on the boundary between the two non-rectangular regions and its corresponding colored neighbor pixels 932, 933, 934, 935, 936, and 937 (samples) to be filtered for complete removal (or at least minimizing) of inconsistencies of the pixel values within the CU 930. In the example of FIG. 9C, more pixels should be processed on the top-left side of the boundary.

In an example, the pixel processing method may comprise pixel low-pass filtering with a varying number of taps (e.g., a varying number of filter coefficients). As noted above, using a larger number of taps may lead to a lower prediction error, and as a result, to a better compression gain. In another example, the pixel low-pass filter may comprise an adaptive non-symmetric filter. Inconsistencies obtained due to utilizing two non-rectangular prediction regions (such as two triangular regions, or a triangular region and non-triangular region) within the same CU may be removed during the VVC-based encoding process without a need to post-process the video. In turn, the perceived visual quality is significantly improved and the overall coding computational complexity is reduced.

Figure 10:
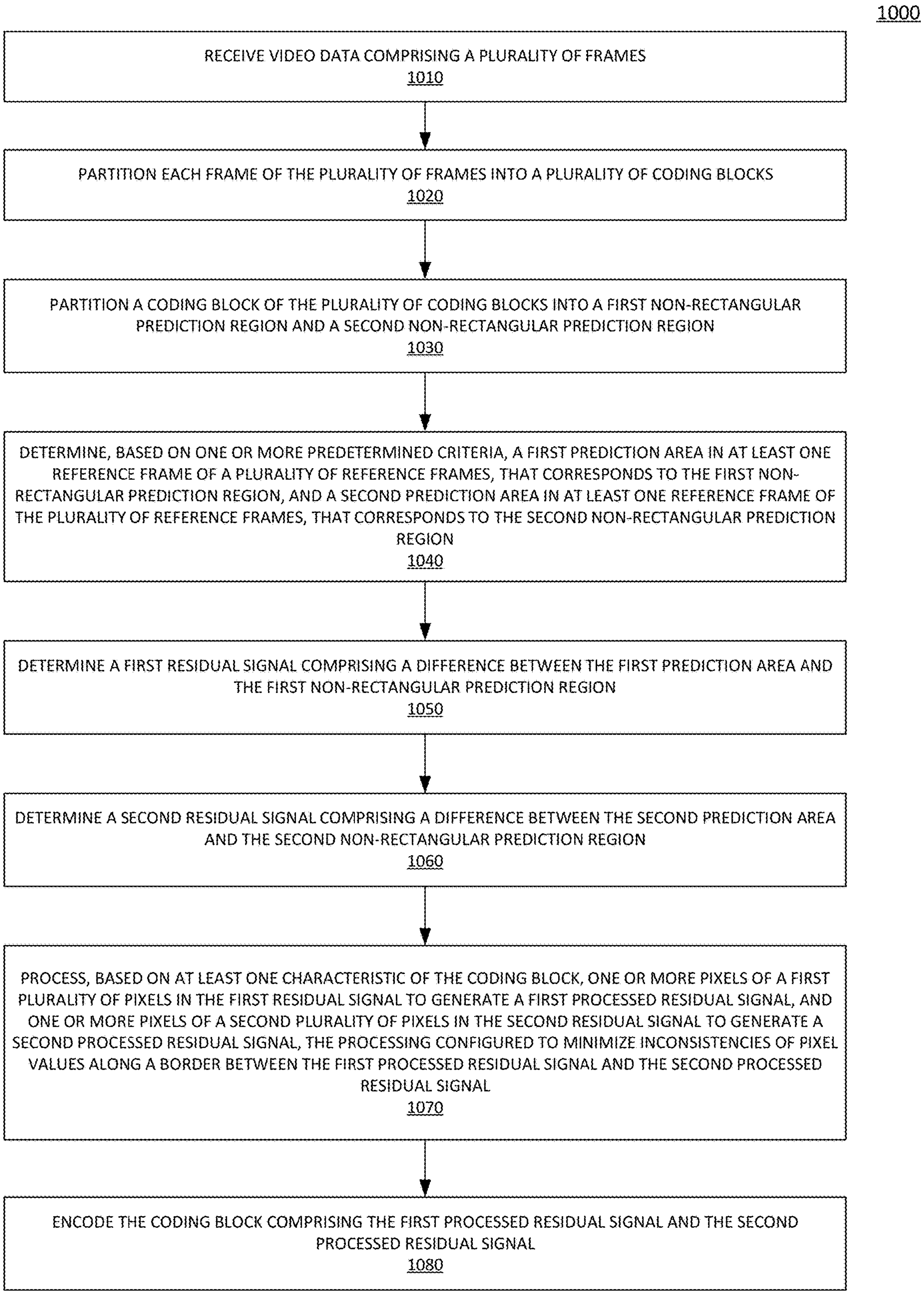
FIG. 10 shows an example method.

FIG. 10 shows an example method 1000. The method 1000 of FIG. 10, may be performed by the encoder 104 or computing device 110 of FIG. 1. At step 1010, video data comprising a plurality of frames may be received. At step 1020, each frame of the plurality of frames may be partitioned into a plurality of coding blocks. At step 1030, a coding block of the plurality of coding blocks may be partitioned into a first non-rectangular prediction region and a second non-rectangular prediction region. The first non-rectangular prediction region may comprise a triangular or non-triangular region of the coding unit and the second non-rectangular prediction region may comprise a triangular or non-triangular region of the coding unit.

At step 1040, a first prediction area in at least one reference frame of a plurality of reference frames, that corresponds to the first non-rectangular prediction region may be determined based on one or more predetermined criteria, and a second prediction area in at least one reference frame of the plurality of reference frames, that corresponds to the second non-rectangular prediction region, may be determined based on one or more predetermined criteria. The one or more predetermined criteria may comprise searching for a best match between a prediction area and the first non-rectangular prediction region or second non-rectangular prediction region. At step 1050, a first residual signal comprising a difference between the first prediction area and the first non-rectangular prediction region may be determined. At step 1060, a second residual signal comprising a difference between the second prediction area and the second non-rectangular prediction region may be determined.

At step 1070, one or more pixels of a first plurality of pixels in the first residual signal may be processed to generate a first processed residual signal, and one or more pixels of a second plurality of pixels in the second residual signal may be processed to generate a second processed residual signal, the processing based on at least one characteristic of the coding block and configured to minimize inconsistencies of pixel values along a border between the first processed residual signal and the second processed residual signal. The at least one characteristic of the coding block may comprise a coding block size or coding block shape. The processing may comprise filtering using a discrete Gaussian filter with a plurality of taps and wherein a plurality of coefficients associated with the plurality of taps indicate a filtering strength. If the at least one characteristic of the coding block comprises a coding block size, the filtering may comprise a strength that increases as the coding block size increases. If the at least one characteristic of the coding block comprises a coding block shape, the filtering may comprise a strength that decreases as a slope of the border increases. The filtering may comprise a strength that increases as distance from a border between the coding block and at least one second coding block of the plurality of coding blocks increases. Alternatively or additionally, the processing may comprise applying a weighting factor to each pixel. At step 1080, the coding block comprising the first processed residual signal and the second processed residual signal may be encoded for transmission in a bitstream.

Figure 11:
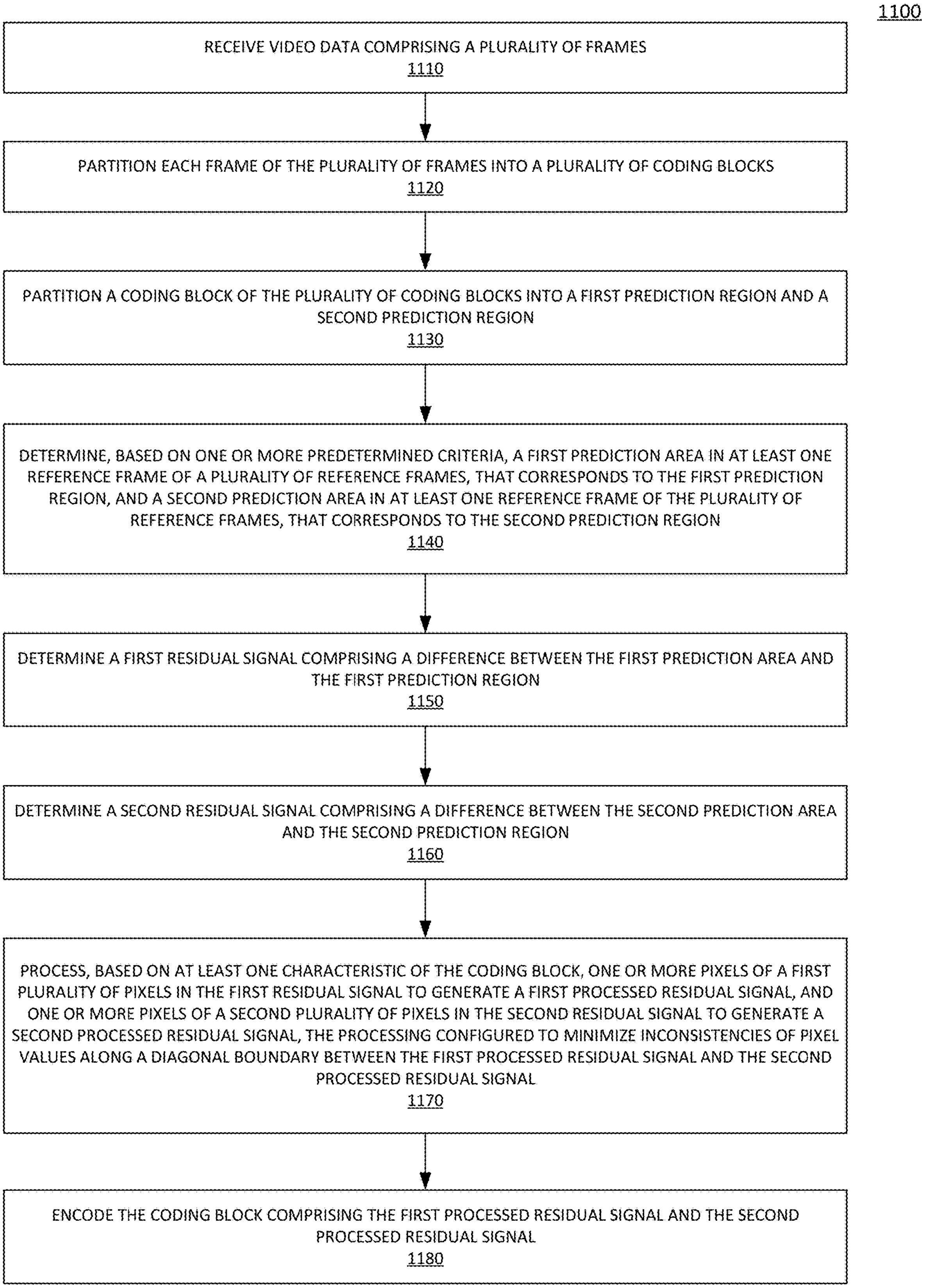
FIG. 11 shows an example method.

FIG. 11 shows an example method 1100. The method 1100 of FIG. 11, may be performed by the encoder 104 or computing device 110 of FIG. 1. At step 1110, video data comprising a plurality of frames may be received. At step 1120, each frame of the plurality of frames may be partitioned into a plurality of coding blocks. At step 1130, a coding block of the plurality of coding blocks may be partitioned into a first prediction region and a second prediction region. The first prediction region may comprise a triangular or non-triangular region of the coding unit and the second prediction region may comprise a triangular or non-triangular region of the coding unit.

At step 1140, a first prediction area in at least one reference frame of a plurality of reference frames, that corresponds to the first region may be determined based on one or more predetermined criteria, and a second prediction area in at least one reference frame of the plurality of reference frames, that corresponds to the second prediction region, may be determined based on one or more predetermined criteria. The one or more predetermined criteria may comprise searching for a best match between a prediction area and the first prediction region or second prediction region. At step 1150, a first residual signal comprising a difference between the first prediction area and the first prediction region may be determined. At step 1160, a second residual signal comprising a difference between the second prediction area and the second prediction region may be determined.

At step 1170, one or more pixels of a first plurality of pixels in the first residual signal may be processed to generate a first processed residual signal, and one or more pixels of a second plurality of pixels in the second residual signal may be processed to generate a second processed residual signal, the processing based on at least one characteristic of the coding block and configured to minimize inconsistencies of pixel values along a diagonal boundary between the first processed residual signal and the second processed residual signal. The at least one characteristic of the coding block may comprise a coding block size or coding block shape. The processing may comprise filtering using a discrete Gaussian filter with a plurality of taps and wherein a plurality of coefficients associated with the plurality of taps indicate a filtering strength. If the at least one characteristic of the coding block comprises a coding block size, the filtering may comprise a strength that increases as the coding block size increases. If the at least one characteristic of the coding block comprises a coding block shape, the filtering may comprise a strength that decreases as a slope of the border increases. The filtering may comprise a strength that increases as distance from a border between the coding block and at least one second coding block of the plurality of coding blocks increases. Alternatively or additionally, the processing may comprise applying a weighting factor to each pixel. At step 1180, the coding block comprising the first processed residual signal and the second processed residual signal may be encoded for transmission in a bitstream.

Figure 12:
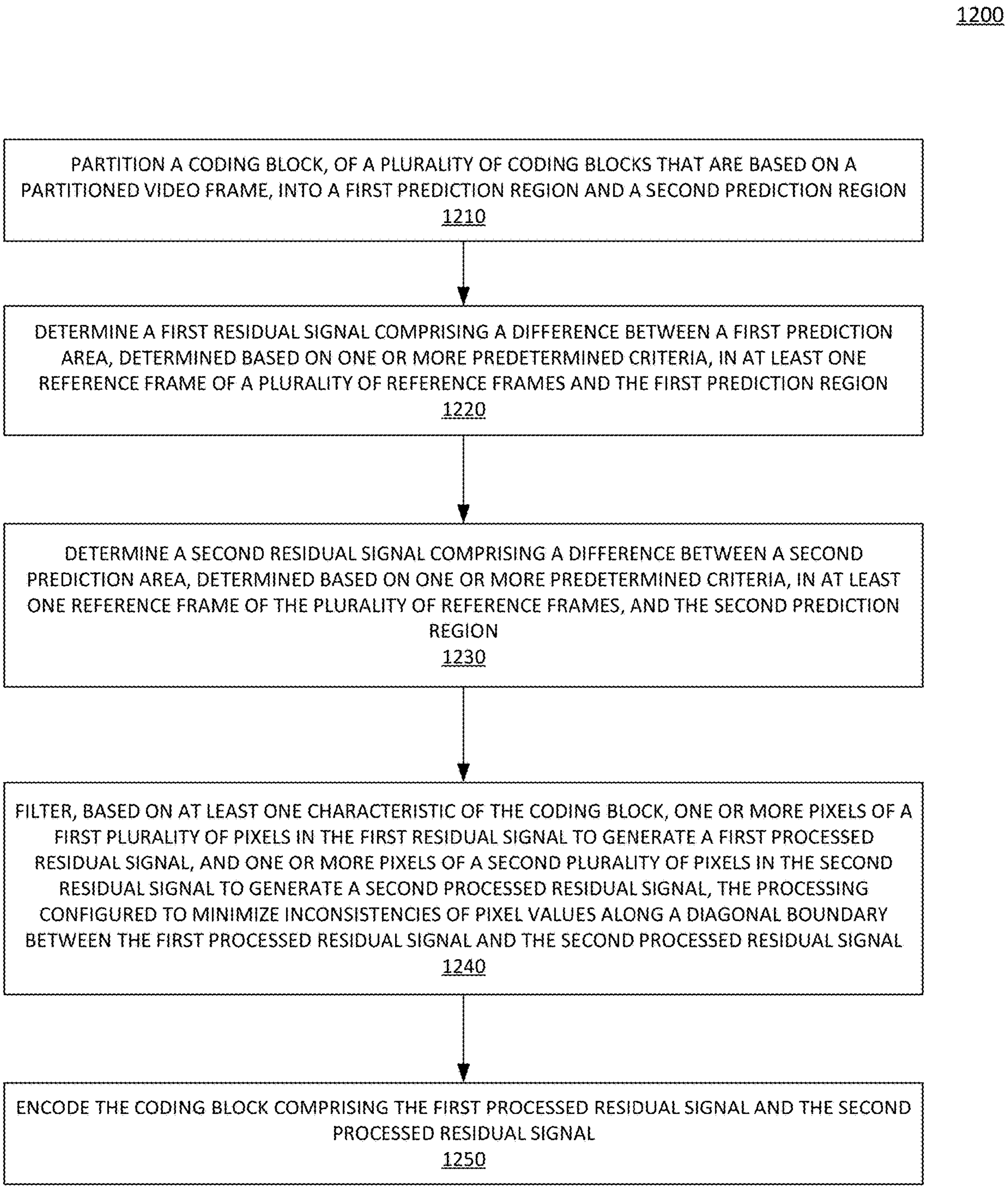
FIG. 12 shows an example method.

FIG. 12 shows an example method 1200. The method 1200 of FIG. 12, may be performed by the encoder 104 or computing device 110 of FIG. 1. At step 1210, a coding block, of a plurality of coding blocks that are based on a partitioned video frame, may be partitioned into a first prediction region and a second prediction region. At step 1220, a first residual signal comprising a difference between a first prediction area, determined based on one or more predetermined criteria, in at least one reference frame of a plurality of reference frames and the first prediction region may be determined. At step 1230, a second residual signal comprising a difference between a second prediction area, determined based on one or more predetermined criteria, in at least one reference frame of the plurality of reference frames, and the second prediction region. At step 1240, one or more pixels of a first plurality of pixels in the first residual signal to generate a first processed residual signal, and one or more pixels of a second plurality of pixels in the second residual signal to generate a second processed residual signal, the processing configured to minimize inconsistencies of pixel values along a diagonal boundary between the first processed residual signal and the second processed residual signal may be filtered based on at least one characteristic of the coding block. At step 1250, the coding block comprising the first processed residual signal and the second processed residual signal may be encoded for transmission in a bitstream.

Figure 13:
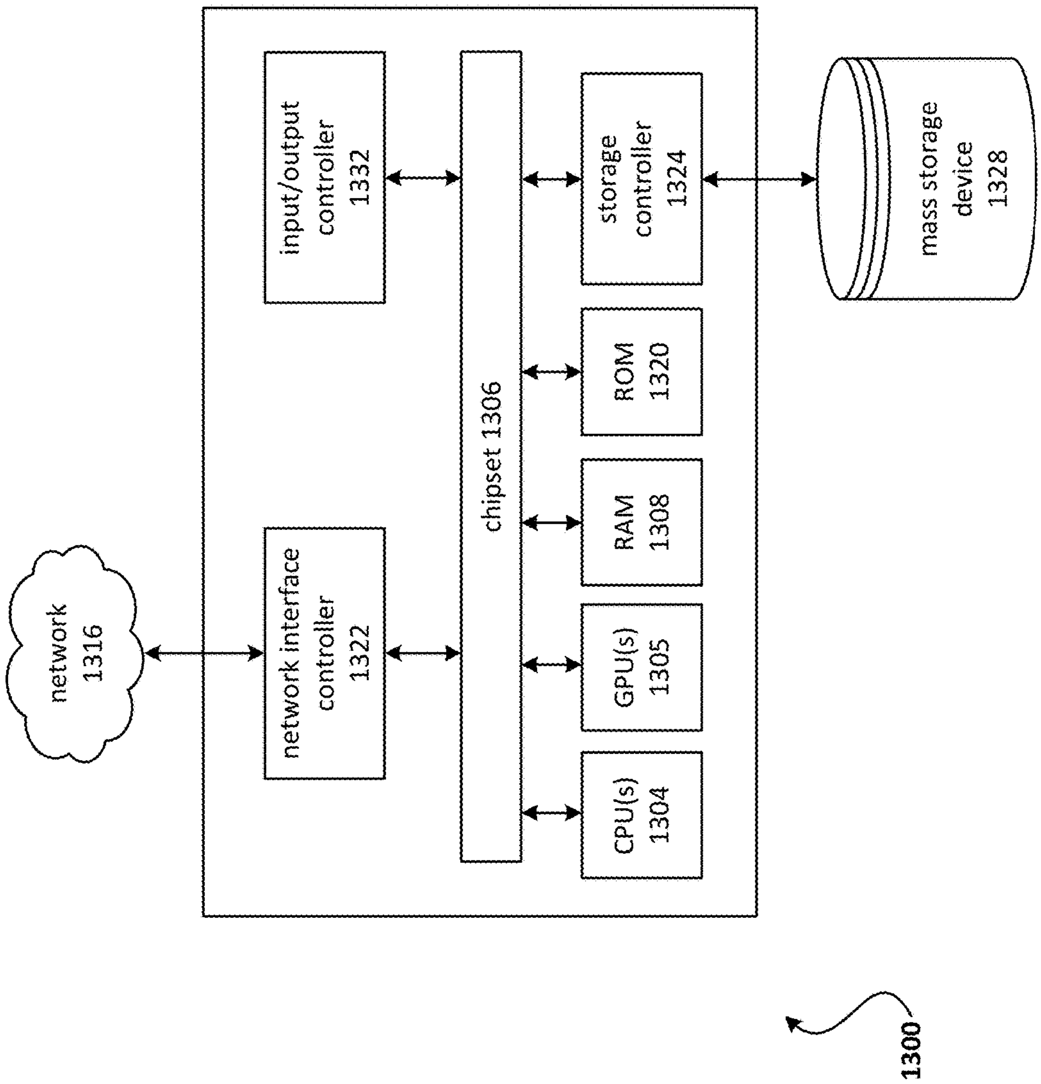
FIG. 13 depicts an example computing device.

FIG. 13 depicts a computing device 1300 that may be used in various aspects, such as the servers, modules, and/or devices depicted in FIG. 1. With regard to the example architectures of FIG. 1, the devices may each be implemented in an instance of a computing device 1300 of FIG. 13. The computer architecture shown in FIG. 13 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2-12.

The computing device 1300 may include a baseboard, or "motherboard," which is a printed circuit board to which a multitude of components or devices may be connected by way of a system bus or other electrical communication paths. One or more central processing units (CPUs) 1304 may operate in conjunction with a chipset 1306. The CPU(s) 1304 may be standard programmable processors that perform arithmetic and logical operations necessary for the operation of the computing device 1300.

The CPU(s) 1304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1304 may be augmented with or replaced by other processing units, such as GPU(s) 1305. The GPU(s) 1305 may comprise processing units specialized for but not necessarily limited to highly parallel computations, such as graphics and other visualization-related processing.

A chipset 1306 may provide an interface between the CPU(s) 1304 and the remainder of the components and devices on the baseboard. The chipset 1306 may provide an interface to a random access memory (RAM) 1308 used as the main memory in the computing device 1300. The chipset 1306 may further provide an interface to a computer-readable storage medium, such as a read-only memory (ROM) 1320 or non-volatile RAM (NVRAM) (not shown), for storing basic routines that may help to start up the computing device 1300 and to transfer information between the various components and devices. ROM 1320 or NVRAM may also store other software components necessary for the operation of the computing device 1300 in accordance with the aspects described herein.

The computing device 1300 may operate in a networked environment using logical connections to remote computing nodes and computer systems through local area network (LAN) 1316. The chipset 1306 may include functionality for providing network connectivity through a network interface controller (NIC) 1322, such as a gigabit Ethernet adapter. A NIC 1322 may be capable of connecting the computing device 1300 to other computing nodes over a network 1316. It should be appreciated that multiple NICs 1322 may be present in the computing device 1300, connecting the computing device to other types of networks and remote computer systems.

The computing device 1300 may be connected to a mass storage device 1328 that provides non-volatile storage for the computer. The mass storage device 1328 may store system programs, application programs, other program modules, and data, which have been described in greater detail herein. The mass storage device 1328 may be connected to the computing device 1300 through a storage controller 1324 connected to the chipset 1306. The mass storage device 1328 may consist of one or more physical storage units. A storage controller 1324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1300 may store data on a mass storage device 1328 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1328 is characterized as primary or secondary storage and the like.

For example, the computing device 1300 may store information to the mass storage device 1328 by issuing instructions through a storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may further read information from the mass storage device 1328 by detecting the physical states or characteristics of one or more particular locations within the physical storage units.

In addition to the mass storage device 1328 described herein, the computing device 1300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1328 depicted in FIG. 13, may store an operating system utilized to control the operation of the computing device 1300. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1328 may store other system or application programs and data utilized by the computing device 1300.

The mass storage device 1328 or other computer-readable storage media may also be encoded with computer-executable instructions, which, when loaded into the computing device 1300, transforms the computing device from a general-purpose computing system into a special-purpose computer capable of implementing the aspects described herein. These computer-executable instructions transform the computing device 1300 by specifying how the CPU(s) 1304 transition between states, as described herein. The computing device 1300 may have access to computer-readable storage media storing computer-executable instructions, which, when executed by the computing device 1300, may perform the methods described in relation to FIG. 3.

A computing device, such as the computing device 1300 depicted in FIG. 13, may also include an input/output controller 1332 for receiving and processing input from a number of input devices, such as a keyboard, a mouse, a touchpad, a touch screen, an electronic stylus, or other type of input device. Similarly, an input/output controller 1332 may provide output to a display, such as a computer monitor, a flat-panel display, a digital projector, a printer, a plotter, or other type of output device. It will be appreciated that the computing device 1300 may not include all of the components shown in FIG. 13, may include other components that are not explicitly shown in FIG. 13, or may utilize an architecture completely different than that shown in FIG. 13.

As described herein, a computing device may be a physical computing device, such as the computing device 1300 of FIG. 13. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:

receiving video data associated with a plurality of frames, wherein the video data indicates a coding block partitioned into a first non-rectangular prediction region and a second non-rectangular prediction region;

determining, a first prediction area in one or more reference frames, that corresponds to the first non-rectangular prediction region, and a second prediction area in the one or more reference frames, that corresponds to the second non-rectangular prediction region;

determining a first residual signal comprising a difference between the first prediction area and the first non-rectangular prediction region and a second residual signal comprising a difference between the second prediction area and the second non-rectangular prediction region;

determining, based on a size of the coding block, a plurality of pixels along each side of a diagonal border between the first residual signal and the second residual signal, to process that minimizes inconsistencies of pixel values among the plurality of pixels along each side of the diagonal border, wherein a filtering strength is determined for each pixel of the plurality of pixels;

processing each pixel of the determined plurality of pixels using the filtering strength determined for each pixel of the plurality of pixels; and encoding the coding block comprising the first residual signal and the second residual signal.

2. The method of claim 1, wherein the first non-rectangular prediction region comprises a first triangular region of the coding block, and the second non-rectangular prediction region comprises at least one of:

a second triangular region of the coding block, or a non-rectangular region of the coding block.

3. The method of claim 1, wherein the processing comprises filtering, based on a low pass filter, to smooth the pixel values of among the plurality of pixels along each side of the diagonal border.

4. The method of claim 3, wherein the low pass filter comprises a discrete Gaussian filter with a plurality of taps and wherein a plurality of coefficients associated with the plurality of taps indicate a filtering strength.

5. The method of claim 4, wherein the filtering strength increases as the size of the coding block increases.

6. The method of claim 4, wherein the processing is further based on a coding block shape and wherein the filtering strength decreases as a slope of the diagonal border increases.

7. The method of claim 4, wherein the filtering strength increases as distance from a border between the coding block and at least one second coding block of the plurality of coding blocks increases.

8. A method comprising:

receiving video data associated with a plurality of frames, wherein the video data indicates a coding block partitioned into a first prediction region and a second prediction region;

determining a first prediction area in one or more reference frames, that corresponds to the first prediction region, and a second prediction area in the one or more reference frames, that corresponds to the second prediction region;

determining a first residual signal comprising a difference between the first prediction area and the first prediction region and a second residual signal comprising a difference between the second prediction area and the second prediction region;

determining, based on a size of the coding block, a plurality of pixels along each side of a diagonal boundary between the first residual signal and the second residual signal, to process that minimizes inconsistencies of pixel values among the plurality of pixels along each side of the diagonal boundary, wherein a filtering strength is determined for each pixel of the plurality of pixels;

processing each pixel of the determined plurality of pixels using the filtering strength determined for each pixel of the plurality of pixels; and encoding the coding block comprising the first residual signal and the second residual signal.

9. The method of claim 8, wherein the first prediction region comprises a first triangular region of the coding block, and the second non-rectangular prediction region comprises at least one of:

a second triangular region of the coding block, or a non-triangular region of the coding block.

10. The method of claim 8, wherein the processing comprises filtering, based on a low pass filter, to smooth the pixel values of among the plurality of pixels along each side of the diagonal boundary.

11. The method of claim 10, wherein the low pass filter comprises a discrete Gaussian filter with a plurality of taps and wherein a plurality of coefficients associated with the plurality of taps indicate a filtering strength.

12. The method of claim 11, wherein the filtering strength increases as the size of the coding block increases.

13. The method of claim 11, wherein the processing is further based on a coding block shape and wherein the filtering strength decreases as a slope of the diagonal boundary increases.

14. The method of claim 11, wherein the filtering strength increases as distance from a border between the coding block and at least one second coding block of the plurality of coding blocks increases.

15. A method comprising:

partitioning a coding block, of a plurality of coding blocks that are based on a partitioned video frame, into a first prediction region and a second prediction region;

determining a first residual signal comprising a difference between a first prediction area, determined based on one or more predetermined criteria, in one or more reference frames and the first prediction region;

determining a second residual signal comprising a difference between a second prediction area, determined based on one or more predetermined criteria, in the one or more reference frames, and the second prediction region;

determining, based on a size of the coding block, a plurality of pixels along each side of a diagonal boundary between the first residual signal and the second residual signal, to process that minimizes inconsistencies of pixel values among the plurality of pixels along each side of the diagonal boundary, wherein a filtering strength is determined for each pixel of the plurality of pixels;

filtering each pixel of the determined plurality of pixels using the filtering strength determined for each pixel of the plurality of pixels; and encoding the coding block comprising the first residual signal and the second residual signal.

16. The method of claim 15, wherein the first prediction region comprises a first triangular region of the coding block and the second prediction region comprises at least one of:

a second triangular region of the coding block, or a non-triangular region of the coding block.

17. The method of claim 15, wherein the filtering comprises filtering, based on a low pass filter, to smooth the pixel values of among the plurality of pixels along each side of the diagonal boundary.

18. The method of claim 15, wherein the size of the coding block exceeds a threshold that is indicative of content that is flat.

19. The method of claim 1, wherein the size of the coding block exceeds a threshold that is indicative of content that is flat.

20. The method of claim 8, wherein the size of the coding block exceeds a threshold that is indicative of content that is flat.

* * * * *